(12) United States Patent
Topchy et al.

(10) Patent No.: US 12,143,658 B2
(45) Date of Patent: Nov. 12, 2024

(54) METHODS AND APPARATUS TO DETECT MULTIPLE WEARABLE METER DEVICES

(71) Applicant: The Nielsen Company (US), LLC, New York, NY (US)

(72) Inventors: Alexander Topchy, New Port Richey, FL (US); John Stavropoulos, Edison, NJ (US)

(73) Assignee: The Nielsen Co (US), LLC, New York, NY (US)

( * ) Notice: Subject to any disclaimer, the term of this patent is extended or adjusted under 35 U.S.C. 154(b) by 265 days.

(21) Appl. No.: 17/958,076

(22) Filed: Sep. 30, 2022

(65) Prior Publication Data

US 2024/0121462 A1    Apr. 11, 2024

(51) Int. Cl.
*H04N 21/414*    (2011.01)
*G01P 15/00*    (2006.01)
*H04N 21/41*    (2011.01)

(52) U.S. Cl.
CPC ....... *H04N 21/41407* (2013.01); *G01P 15/00* (2013.01); *H04N 21/4126* (2013.01)

(58) Field of Classification Search
CPC .......... H04N 21/41407; H04N 21/4126; G01P 15/00
See application file for complete search history.

(56) References Cited

U.S. PATENT DOCUMENTS

| | | |
|---|---|---|
| 10,712,361 B2 | 7/2020 | Jain et al. |
| 11,047,876 B2 | 6/2021 | Jain et al. |
| 2023/0214384 A1* | 7/2023 | Kerkes .................. G06F 16/245 707/769 |

\* cited by examiner

*Primary Examiner* — David L Ton

(57) ABSTRACT

Methods, apparatus, systems, and articles of manufacture are disclosed. An example apparatus includes interface circuitry to: obtain primary data from a first meter and a second meter, the primary data including at least one of: (a) acceleration data and (b) short-range wireless communication data; and obtain secondary data from the first meter and the second meter, the secondary data including at least one of: (a) location data and (b) audio data; comparator circuitry to: determine one or more primary factors based on the primary data, the primary factors to include at least one of a correlation coefficient or a difference in connected device sequences; determine one or more secondary factors based on the secondary data; and model executor circuitry to determine, based on the one or more primary factors and the one or more secondary factors, whether the first meter and the second meter correspond to duplicate wear.

20 Claims, 13 Drawing Sheets

METHODS AND APPARATUS TO DETECT MULTIPLE WEARABLE METER DEVICES

FIELD OF THE DISCLOSURE

This disclosure relates generally to audience measurement and, more particularly, to methods and apparatus to detect multiple wearable meter devices.

BACKGROUND

In recent years, the number of forms through which individuals consume media has increased. For example, an individual may consume radio media, linear media, streaming video on demand (SVOD) media, etc. In many examples, a form of media may be accessible from many locations. As such, some audience measurement entities (AMEs) deploy wearable meter devices for panelists to carry on their person. The wearable meter devices may collect media presentation information, regardless of where the panelists are located.

BRIEF DESCRIPTION OF THE DRAWINGS

In general, the same reference numbers will be used throughout the drawing(s) and accompanying written description to refer to the same or like parts. The figures are not to scale.

Figure 1:
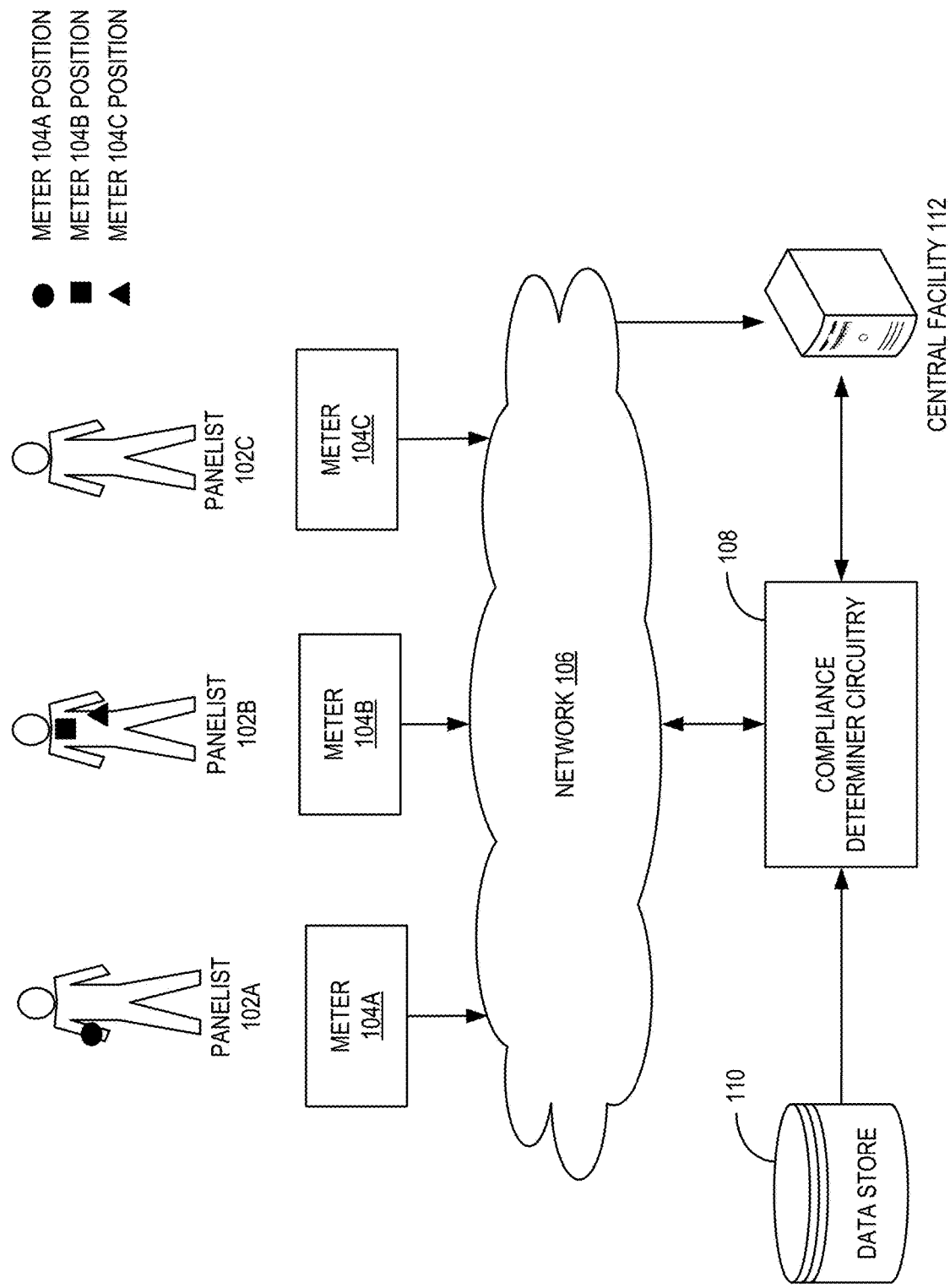
FIG. 1 is block diagram of an example environment in which multiple wearable meter devices on a panelist may be detected.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Many entities have an interest in understanding how users are exposed to media. For example, an audience measurement entity (AME) desires knowledge of how users interact with media devices, such as smartphones, tablets, laptops, smart televisions, etc., and/or media presented thereon. For example, an AME may want to monitor media presentations made at the media devices to, among other things, monitor exposure to advertisements, determine advertisement effectiveness, determine user behavior, identify purchasing behavior associated with various demographics, etc.

AMEs coordinate with advertisers to obtain knowledge regarding an audience of media. For example, advertisers are interested in knowing the composition, engagement, size, etc., of an audience for media. For example, media (e.g., audio and/or video media) may be distributed by a media distributor to media consumers. Content distributors, advertisers, content producers, etc. have an interest in knowing the size of an audience for media by the media distributor, the extent to which an audience consumes the media, whether the audience pauses, rewinds, fast-forwards the media, etc. In some examples, the term "content" includes programs, advertisements, clips, shows, etc., In some examples, the term "media" includes any type of audio and/or visual content and/or advertisement delivered via any type of distribution medium. Thus, media includes television programming and/or advertisements, radio programming and/or advertisements, movies, web sites, streaming media, etc. Unless context clearly dictates otherwise, for ease of explanation, "media" refers to a piece of media (e.g., movie, TV show, etc.) in its entirety.

To obtain knowledge regarding an audience, AMEs may collect data from panelists. As used above and herein, a panelist refers to an individual that agrees to share an amount of data with an AME. Many types of technologies exist for collecting media consumption data from panelists. One example of panelist data technology is wearable meter devices. As used above and herein, a wearable meter device may refer to any device that can be worn on an individual to collect media consumption data.

AMEs may use a variety of techniques to collect, organize, and manage data from wearable meter devices. For example, one or more members of a household may agree to share data with an AME as panelists. In turn, AMEs may group the one or more panelists together based on their shared household. An example AME may find a household based grouping of panelists valuable because individuals who live together may consume the same media in a group setting, influence one another to consume different types of media, etc.

In some examples, an AME may assign one wearable meter device to each panelist. Accordingly, the AME may analyze data based on the assigned one-to-one correspondence between wearable meter devices and panelists. However, panelists that frequently interact with one another (such as those living in the same household) may, in some examples, break the one-to-one correspondence. For example, suppose a first panelist is assigned a first wearable meter device, a second panelist is assigned a second meter wearable meter device, and both panelists are members of the same household. If the first panelist loses interest in carrying the first wearable meter device on their person, the second panelist may decide to carry both the first wearable meter device and the second wearable meter device on their person. In some examples, duplicate wear may refer to situations where panelists break the one-to-one correspondence as described previously.

Example AMEs seek to detect occurrences of duplicate wear for any number of reasons. For example, duplicate wear may provide inaccurate data for the AME to analyze because two wearable meter devices record the media consumption of a single panelist while the media consumption of another panelist is not recorded at all. Furthermore, an example AME may be incentivized to end a business agreement and/or otherwise reprimand panelists if duplicate wear occurs regularly.

Previous solutions to detect duplicate wear protection use techniques based on prior versions of wearable meter devices. For example, Portable People Meter (PPM) 360, a prior version of a wearable meter device, was designed to be worn on waistband like a pager. The single designed location enabled previous solutions to detect duplicate wear based on obtaining coarse grain acceleration data to characterize the movement of the PPM 360.

Unlike the PPM 360, some newer wearable meter devices are designed for the panelist to wear in a variety of locations on their person. For example, some newer wearable meter devices may be worn on a waistband, on a wrist, or around a neck. In some examples, newer wearable meter devices may additionally be placed in a pocket, purse, or similar bag carried by a panelist. In some examples, panelists may carry a newer wearable meter device on their person in a different wearable configuration than those listed previously. As such, previous solutions to detect duplicate wear may be ineffective on newer wearable meter devices due to the wide variety of acceleration profiles that naturally arise from different wearable configurations.

Example methods, systems, and apparatus described herein accurately detect duplicate wear in wearable meter devices that may be carried by a panelist in a variety of wearable configurations. Example compliance determiner circuitry includes example model trainer circuitry to create a machine learning model that detects duplicate wear, interface circuitry to obtain a variety of types of data from the example wearable meter devices, and model executor circuitry to execute the model based on the variety of wearable meter device data. The variety of wearable meter device data may include, but is not limited to, example granular motion data (i.e., acceleration data recorded in more frequent intervals than previous solutions), location data, audio data, and short-range wireless communication data. Short-range wireless communication data may include, but is not limited to, Bluetooth®. The example compliance determiner circuitry also includes comparator circuitry and comparator circuitry to pre-process some types of wearable meter device data before the example model executor circuitry executes the model.

FIG. 1 is block diagram of an example environment in which multiple wearable meter devices on a panelist may be detected. FIG. 1 includes example panelists 102A, 102B, 102C, example meters 104A, 104B, 104C, an example network 106, example compliance determiner circuitry 108, an example data store 110, and an example central facility 112.

The example panelists 102A, 102B, 102C are individuals who agree to share data with an example AME. In some examples, the panelists 102A, 102B, 102C may be members of the same household.

The example meters 104A, 104B, 104C record data used by the example AME. Each of the example meters 104A, 104B, 104C may record acceleration data, location data, audio data, and short-range wireless communication data (e.g., Bluetooth®) data) over time for use by the example AME. In some examples, one or more of the example meters 104A, 104B, 104C may additionally or alternatively record other types of data over time for the example AME. The example meters 104A, 104B, 104C are examples of wearable meter devices that have multiple wearable configurations. For example, the example meters 104A, 104B, 104C may be worn like a watch, a necklace, or a pager. The example meters 104A, 104B, 104C may additionally or alternatively be placed in a pocket or purse like a phone, etc.

The example network 106 FIG. 1 connects and facilitates communication between at least the example meters 104A, 104B, 104C and the example compliance determiner circuitry 108. In this example, the network 106 is the Internet. However, the example network 106 may be implemented using any suitable wired and/or wireless network(s) including, for example, one or more data buses, one or more local area networks (LANs), one or more wireless LANs (WLANs), one or more cellular networks, one or more coaxial cable networks, one or more satellite networks, one or more private networks, one or more public networks, etc. As used above and herein, the term "communicate" including variances (e.g., secure or non-secure communications, compressed or non-compressed communications, etc.) thereof, encompasses direct communication and/or indirect communication through one or more intermediary components and does not require direct physical (e.g., wired) communication and/or constant communication, but rather includes selective communication at periodic or aperiodic intervals, as well as one-time events.

The example compliance determiner circuitry 108 obtains data from the example meters 104A, 104B, 104C. While FIG. 1 only illustrates three meters for simplicity, the example compliance determiner circuitry 108 may obtain data over time from any number of additional meters. In such examples, some of the additional meters may correspond to panelists that are grouped together based on a shared household, while others of the additional meters may correspond to panelists that are not grouped by the example AME.

The example compliance determiner circuitry 108 analyzes the data obtained over time from the meters to determine which panelists are compliant with the required one-to-one correspondence between an individual and their wearable meter device. For example, the compliance determiner circuitry 108 may analyze the data from the meters 104A, 104B, 104C to determine that both meters 104B, 104C have identical or substantially similar data for a threshold amount of time, which indicates they are being carried by the same person. The example compliance determiner circuitry 108 may also determine the example meter 104A provided unique data that does substantially match data from any other meter.

The example compliance determiner circuitry 108 may make the foregoing determinations because, in the illustrative example of FIG. 1, the example panelist 102B is wearing both the example meter 104B and the example meter 104C. The illustrative example of FIG. 1 also shows the example panelist 102C not wearing any meter, the example panelist 102A wearing only the example meter 104A. As a result, the example compliance determiner circuitry 108 may determine, based on the uniqueness of the data from example meter 104A, that example panelist 102A is not engaged in duplicate wear and is therefore compliant with the requirements of the example AME. Similarly, the example compliance determiner circuitry 108 may determine the example panelists 102B, 102C are engaging in duplicate wear (and therefore not compliant) based on the substantial similarities between the data from the example meters 104B, 104C. The example compliance determiner circuitry 108 is discussed further in connection with FIG. 2.

Figure 2:
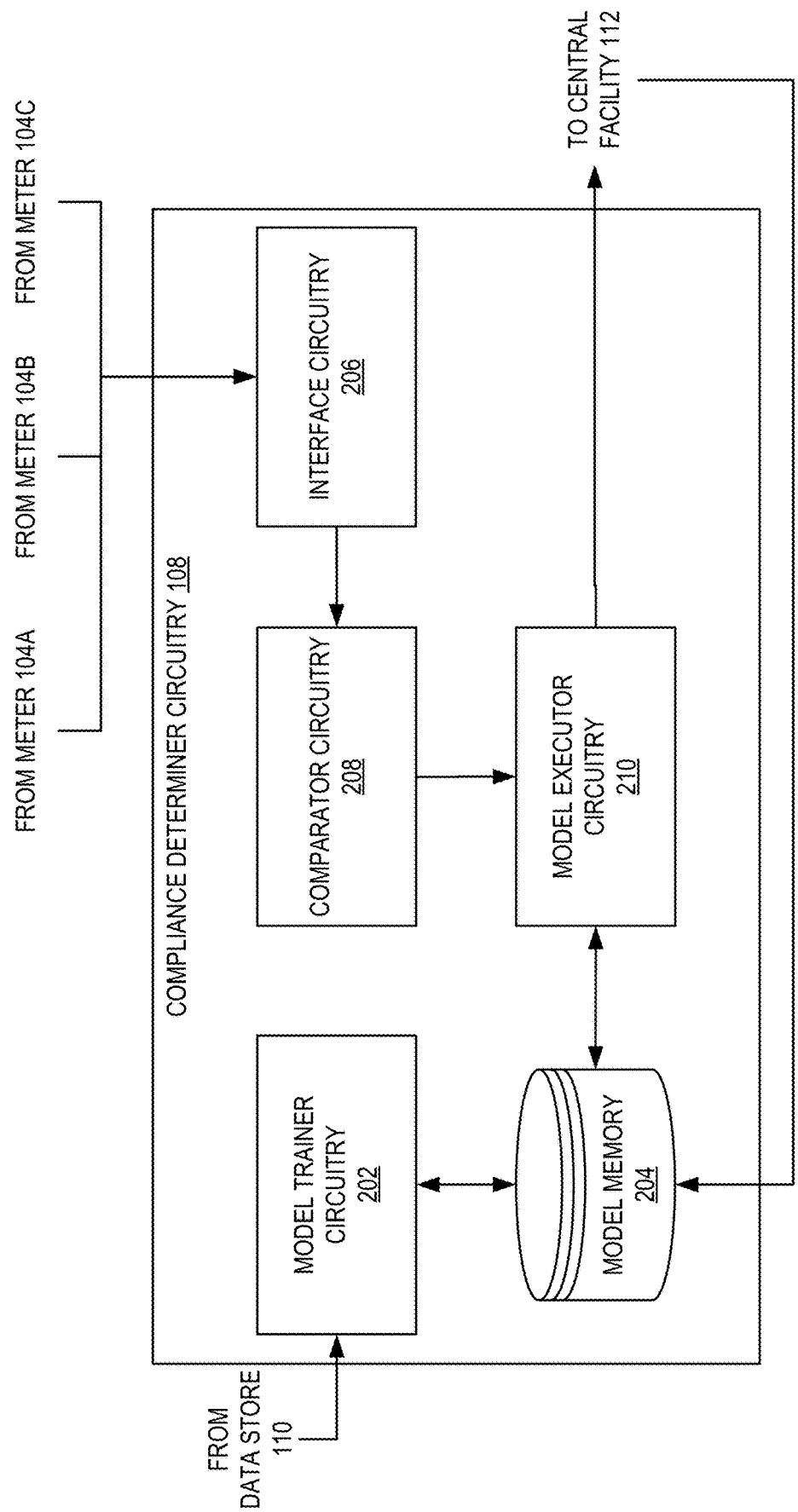
FIG. 2 is a block diagram of an example implementation of the compliance determinator circuitry of FIG. 1.

As discussed in FIG. 2, the example compliance determiner circuitry 108 may execute a machine learning model to determine when panelists are engaged in duplicate wear. Before the model is executed, the example compliance determiner circuitry 108 first trains the model using training data from the example data store 110. The example data store 110 may contain any type and any amount of training data. For example, the example data store 110 may include, but is not limited to, acceleration data, location data, audio data, and short-range wireless communication data from meters that the example AME knows do or do not correspond to duplicate wear. For example, an AME may ask a first person to wear a first meter and a second meter, a second person to wear a third, fourth, and fifth meter, and a third person to wear only a sixth meter. In such examples, data from all six meters may be stored in the example data store 110. The example data store 110 may also store labels that describe which of the six sets of meter data correspond to instances duplicate wear. As used above and herein, the terms "meter" and "wearable meter device" may be used interchangeably.

The example data store 110 is implemented by any memory, storage device and/or storage disc for storing data such as, for example, flash memory, magnetic media, optical media, solid state memory, hard drive(s), thumb drive(s), etc. Furthermore, the data stored in the example data store 110 may be in any data format such as, for example, binary data, comma delimited data, tab delimited data, structured query language (SQL) structures, etc. While, in the illustrated example, the example data store 110 is illustrated as a single device, the example data store 110 and/or any other data storage devices described herein may be implemented by any number and/or type(s) of memories.

The example central facility 112 refers to a set of resources that are managed by the example AME. Accordingly, the example central facility 112 may include one or more servers, databases, and systems used to store meter data, determine media ratings, etc. The example central facility 112 obtains the data from the example meters 104A, 104B, 104C via the network, and obtains information describing which panelists are compliant and which panelists are engaged in duplicate wear. When the example central facility 112 obtains information that two sets of meter data correspond to duplicate wear, the central facility may decide to credit a media presentation only once (as opposed to twice, as the meter data initially suggests), may reprimand the non-compliant panelists, etc.

While FIG. 1 illustrates the example central facility 112 obtaining compliance information through local communication with the example compliance determiner circuitry 108 such as a wired cable, Near Field Communication (NFC), Bluetooth®, etc., in some examples, the example compliance determiner circuitry 108 and the example central facility 112 communicate via the network 106. In some examples, the set of resources included in the central facility 112 may include the compliance determiner circuitry 108.

FIG. 1 illustrates an example of duplicate wear in panelists 102B, 102C. FIG. 1 also illustrates how the example compliance determiner circuitry 108 determines and reports non-compliance with the example AME's requirement that panelists engage in a one-to-once correspondence between a panelist and their corresponding wearable meter device. Advantageously, the example compliance determiner circuitry 108 determines panelist compliance based on higher quality, more diverse types of data than the coarse grain acceleration data that may be employed by previous solutions to detect duplicate wear. For example, the example compliance determiner circuitry 108 may sample the example meters 104A, 104B, 104C more frequently for acceleration data than previous solutions. The example compliance determiner circuitry 108 may additionally request other types of data from the meters 104A, 104B, 104C that include but are not limited to location data, audio data, short-range wireless communication data, etc. As a result, the example compliance determiner circuitry 108 can develop and execute a machine learning model to accurately determine duplicate wear in wearable meter devices that support multiple wearable configurations. In contrast, previous solutions to determine duplicate wear may be unable to determine duplicate wear in wearable meter devices that support multiple wearable configurations or may do so less accurately than examples described herein.

FIG. 2 is a block diagram of example compliance determiner circuitry 108 to determine duplicate wear in wearable meter devices that support multiple wearable configurations. The example compliance determiner circuitry 108 of FIG. 2 may be instantiated (e.g., creating an instance of, bring into being for any length of time, materialize, implement, etc.) by processor circuitry such as a central processing unit executing instructions. Additionally or alternatively, the example compliance determiner circuitry 108 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers. The example compliance determiner circuitry 108 includes example model trainer circuitry 202, example model memory 204, example interface circuitry 206, example comparator circuitry 208, and example model executor circuitry 210.

The example model trainer circuitry 202 trains a machine learning (ML) model to detect duplicate wear in data from wearable meter devices. The example model trainer circuitry 202 trains the ML model using training data from the example data store 110. The example model trainer circuitry 202 may train any type of ML model. Example ML model architectures that the example model trainer circuitry 202 may deploy include, but are not limited to weighted sum computations, decision trees, neural networks, linear or logistic regression, random forests, k-Means clustering, etc.

To train the ML model, the example model trainer circuitry 202 may develop an initial set of parameters used to execute an initial version of the ML model. The example model trainer circuitry 202 may execute the initial version of the ML model, and compare the results of the model execution (a classification of each meter as either exhibiting or not exhibiting duplicate wear) to the known labels from the data store 110. When analyzing the results of some nth version of the ML model, the example model trainer circuitry 202 may additionally compare the results to the previous version (i.e., the (n−1)th version) of the model to determine how the new results differ from the previous ones. Based on the one or more results comparison, the example model trainer circuitry 202 may adjust one or more parameters to develop an (n+1)th version of the model. The example model trainer circuitry 202 may iteratively tweak parameters and test new versions of the ML model until the results of a particular version satisfy an accuracy threshold set by the example AME. For example, the example AME may require the final version of the ML model accurately classify a certain percentage of all known and unknown sets of meter data as exhibiting or not exhibiting duplicate wear. In some examples, the model trainer circuitry 202 is instantiated by processor circuitry executing model trainer instructions and/or configured to perform operations such as those represented by the flowchart of FIG. 3.

The example model memory 204 stores data related to the example ML model developed by the example model trainer circuitry 202 and executed by the example model executor circuitry 210. For example, the model memory 204 may store one or more sets of parameters that distinguish one version of the ML model from another. The example model memory 204 may also store one or more model results (i.e., classifications of meters as either exhibiting or not exhibiting duplicate wear) that correspond to the various versions of the model created by the example model trainer circuitry 202.

The example model memory 204 may be implemented as any type of memory. For example, the example model memory 204 may be a volatile memory or a non-volatile memory. The volatile memory may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory may be implemented by flash memory and/or any other desired type of memory device.

The example interface circuitry 206 obtains primary and secondary data from the example meters 104A, 104B, 104C via the network 106. Primary data refers to types of data that may, in some examples, be sufficiently accurate to use as a singular input in duplicate wear identification. Primary data may include, but is not limited to, acceleration data and/or short-range wireless communication data. In contrast, secondary data refers to types of data that are not accurate enough to use as a singular input in duplicate wear identification. Instead, the example model trainer circuitry 202 may rely on secondary data, when available, as an additional input to primary data to identify duplicate wear. Secondary data may include, but is not limited to, location data and/or audio data.

The example interface circuitry 206 may obtain data from any number of meters. The example interface circuitry 206 may implement any type of transceiver and may use any communication protocol to obtain the variety of types of data produced by the example meters as described previously. For example, the example interface circuitry 206 may implement one or more of a WiFi® transceiver, an Ethernet® PHY, a Bluetooth transceiver, etc. In some examples, the interface circuitry 206 is instantiated by processor circuitry executing interface instructions and/or configured to perform operations such as those represented by the flowchart of FIG. 4.

In some examples, the meter data obtained from the example interface circuitry 206 may be referred to as unknown because the data is obtained from actual panelists.

As a result, the example AME does not definitively know whether the data obtained by the example interface circuitry 206 corresponds to duplicate wear. This contrasts the training data in the example data store 110, where the example AME definitively knows which sets of data correspond to duplicate wear and labels the data sets appropriately.

The example comparator circuitry 208 determines one or more primary factors based on the available primary data and one or more secondary factors from the available secondary data. To determine primary and secondary factors, the example comparator circuitry 208 compares similar types of data from multiple meters to determine differences between the meters. For example, the example comparator circuitry 208 may determine a primary factor to be a difference between a first sequence of connected devices recorded in the short-range wireless communication data of the example meter 104A and a second sequence of connected devices recorded in the short-range wireless communication data of the example meter 104B.

The example comparator circuitry 208 may additionally or alternatively determine a primary factor to be a Pearson correlation coefficient (PCC). A PCC measures the linear relationship between two sets of data. In the illustrative example of FIG. 2, the comparator circuitry 208 calculates the linear correlation between the acceleration of two different meters. In some examples, the example compliance determiner circuitry 108 may determine a different type of correlation data besides PCCs to characterize one or more types of meter data.

The example comparator circuitry 208 may determine a secondary factor by calculating a difference between first audio data from the example meter 104A and second audio data from the example meter 104B. The example comparator circuitry 208 may compare media signatures from the example meters 104A, 104B to determine the difference between audio data. Media signatures can take many forms (e.g., a series of digital values, a waveform, etc.), but are typically representative of some aspect of monitored media signals. The example comparator circuitry 208 may additionally or alternatively determine a secondary factor by calculating one or more distances between the meters 104A, 104B, 104C using their respective location data.

In some examples, for each type of comparison, the example comparator circuitry 208 may make $$\binom{n}{2}$$

comparisons from a data set of n meters to determine the differences between any combination of two meters. In other examples, for each type of comparison, the example comparator circuitry 208 may make a different number of comparisons from a data set of n meters. In some examples, the comparator circuitry 208 is instantiated by processor circuitry executing comparator instructions and/or configured to perform operations such as those represented by the flowchart of FIG. 4.

The example model executor circuitry 210 executes a version of the ML model using parameters stored in the example model memory 204. Specifically, the example model executor circuitry 210 executes a version of the ML model that the example model trainer circuitry 202 verified satisfies an accuracy threshold set by the example AME. For each meter, the example model executor circuitry 210 outputs a determination of whether the panelist wearing the meter is also wearing another meter (i.e., whether a panelist is engaging in duplicate wear). In some examples, the model executor circuitry 210 may access a look up table or similar database to associate a particular meter with a panelist (e.g., meter 104A with panelist 102A) and report to the example central facility 112 whether the panelist is compliant. In other examples, the model executor circuitry 210 provides the output of the ML model directly to the example central facility 112. In such examples, the example central facility 112 may associate the meter with a panelist and determine compliance.

In the illustrative example of FIG. 2, the model executor circuitry 210 uses both primary factors and secondary factors as inputs to detect duplicate wear. In other examples, the model executor circuitry 210 may only use one or more primary factors as inputs to detect duplicate wear. The calculation of PCC values, connected device sequence differences, audio data differences, location data differences, etc. may be referred to as initial steps of the example ML model. In such examples, the data obtained directly from the example interface circuitry 206 may be considered inputs to the example model executor circuitry 210. In some examples, the model executor circuitry 210 is instantiated by processor circuitry executing model executor instructions and/or configured to perform operations such as those represented by the flowchart of FIGS. 4, 5, 6.

Within the example compliance determiner circuitry 108, the example model executor circuitry 210 implements a ML model that was trained using known meter data. In doing so, the example model executor circuitry 210 may classify duplicate wear from unknown meter data at a high level of accuracy. Furthermore, the use of the example ML model to analyze multiple types of meter data and determine the relative importance of each type of data enables the example compliance determiner circuitry 108 to accurately classify wearable meter devices using techniques that are not tied to a specific manner of carrying the wearable meter device. For example, primary factors may be considered more important when identifying duplicate wear than secondary factors because primary data may be more accurate and/or more reliable than secondary data for duplicate wear identification. This contrasts previous solutions to determine duplicate wear, which assume the meter data corresponds to a particular manner carrying the wearable meter device. Therefore, the example compliance determiner circuitry 108 can determine duplicate wear in wearable meter devices that are designed to be worn in multiple configurations with a greater level of accuracy than previous solutions.

In some examples, the example compliance determiner circuitry 108 includes means for obtaining at least one of: a) location data, b) acceleration data, c) audio data, and d) short-range wireless communication data. For example, the means for obtaining may be implemented by interface circuitry 206. In some examples, the interface circuitry 206 may be instantiated by processor circuitry such as the example processor circuitry 1012 of FIG. 10. For instance, the interface circuitry 206 may be instantiated by the example microprocessor 1100 of FIG. 11 executing machine executable instructions such as those implemented by at least blocks 402 of FIG. 4. In some examples, the interface circuitry 206 may be instantiated by hardware logic circuitry, which may be implemented by an ASIC, XPU, or the FPGA circuitry 1200 of FIG. 12 structured to perform operations corresponding to the machine readable instructions. Additionally or alternatively, the interface circuitry 206 may be instantiated by any other combination of hardware, software, and/or firmware. For example, the interface circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the example compliance determiner circuitry 108 includes means for comparing to determine at least one of a correlation coefficient, a distance between meters, a difference between audio data, or a difference between connected device sequences. For example, the means for comparing may be implemented by comparator circuitry 208. In some examples, the comparator circuitry 208 may be instantiated by processor circuitry such as the example processor circuitry 1012 of FIG. 10. For instance, the comparator circuitry 208 may be instantiated by the example microprocessor 1100 of FIG. 11 executing machine executable instructions such as those implemented by at least blocks 404, 406, 408, 410 of FIG. 4. In some examples, the comparator circuitry 208 may be instantiated by hardware logic circuitry, which may be implemented by an ASIC, XPU, or the FPGA circuitry 1200 of FIG. 12 structured to perform operations corresponding to the machine readable instructions. Additionally or alternatively, the comparator circuitry 208 may be instantiated by any other combination of hardware, software, and/or firmware. For example, the comparator circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the example compliance determiner circuitry 108 includes means for executing a ML model to determine whether the meters correspond to duplicate wear. For example, the means for executing may be implemented by model executor circuitry 210. In some examples, the model executor circuitry 210 may be instantiated by processor circuitry such as the example processor circuitry 1012 of FIG. 10. For instance, the model executor circuitry 210 may be instantiated by the example microprocessor 1100 of FIG. 11 executing machine executable instructions such as those implemented by at least blocks 412 of FIG. 4. In some examples, the model executor circuitry 210 may be instantiated by hardware logic circuitry, which may be implemented by an ASIC, XPU, or the FPGA circuitry 1200 of FIG. 12 structured to perform operations corresponding to the machine readable instructions. Additionally or alternatively, the model executor circuitry 210 may be instantiated by any other combination of hardware, software, and/or firmware. For example, the model executor circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the example compliance determiner circuitry 108 of FIG. 1 is illustrated in FIG. 2, one or more of the elements, processes, and/or devices illustrated in FIG. 2 may be combined, divided, re-arranged, omitted, eliminated, and/or implemented in any other way. Further, the example model trainer circuitry 202, the example interface circuitry 206, the example comparator circuitry 208, and the example model executor circuitry 210, and/or, more generally, the example compliance determiner circuitry 108 of FIG. 1, may be implemented by hardware alone or by hardware in combination with software and/or firmware. Thus, for example, any of the example model trainer circuitry 202, the example interface circuitry 206, the example comparator circuitry 208, and the example model executor circuitry 210, and/or, more generally, the example compliance determiner circuitry 108 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example compliance determiner circuitry 108 of FIG. 1 may include one or more elements, processes, and/or devices in addition to, or instead of, those illustrated in FIG. 2, and/or may include more than one of any or all of the illustrated elements, processes and devices.

A flowchart representative of example machine readable instructions, which may be executed to configure processor circuitry to implement the compliance determiner circuitry 108 of FIG. 2, is shown in FIGS. 3, 4, 5, 6. The machine readable instructions may be one or more executable programs or portion(s) of an executable program for execution by processor circuitry, such as the processor circuitry 1012 shown in the example processor platform 1000 discussed below in connection with FIG. 10 and/or the example processor circuitry discussed below in connection with FIGS. 11 and/or 12. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 3, 4, 5, 6, many other methods of implementing the example compliance determiner circuitry 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 3, 4, 5, 6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 3:
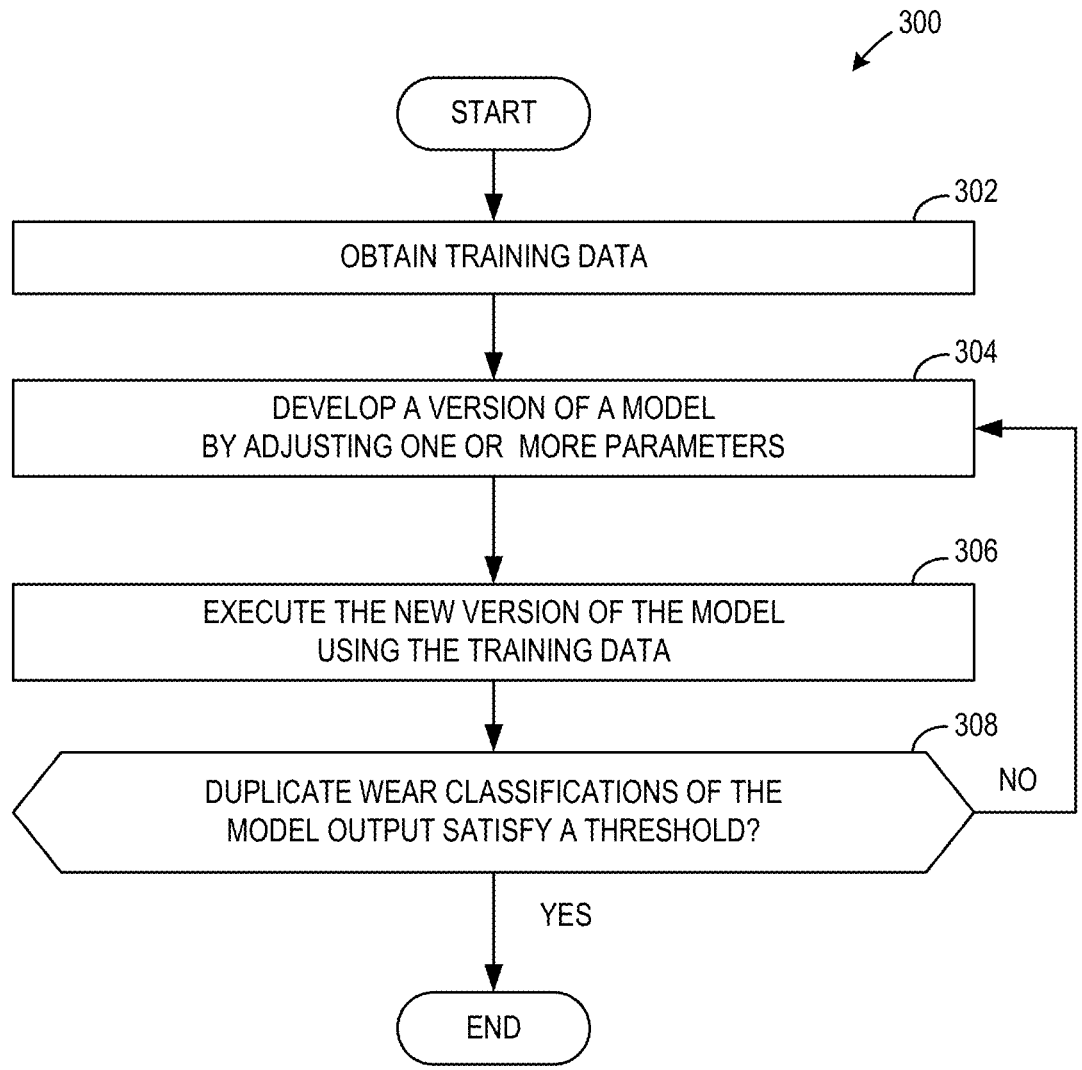
FIG. 3 is a flowchart representative of example machine readable instructions and/or example operations that may be executed by example processor circuitry to implement the example model trainer circuitry of FIG. 2.

FIG. 3 is a flowchart representative of example machine readable instructions and/or example operations 300 that may be executed and/or instantiated by processor circuitry to train a ML model to detect duplicate wear. The machine readable instructions and/or the operations 300 of FIG. 3 begin when the example model trainer circuitry 202 obtains training data. (Block 302). The example model trainer circuitry 202 may obtain the training data from the example data store 110. The training data may include location, acceleration, audio, short-range wireless communication, and other types of data from meters that the example AME knows either do or do not correspond to duplicate wear. The training data may also include labels that describe which sets of meter data correspond to duplicate wear.

The example model trainer circuitry 202 develops a version of a ML model by adjusting one or more parameters. (Block 304). If a previous version of a ML model has not been developed, the example model trainer circuitry 202 may develop an initial version of a ML model and may determine one or more initial parameter values at block 304. The example model trainer circuitry 202 may develop a ML model using any type of architecture as described previously.

The example model trainer circuitry 202 executes the version of the model from block 304 using the training data of block 302. (Block 306). By executing the ML model, the example model trainer circuitry 202 obtains a classification for each input meter data set. The classification of a given meter may describe whether the meter is being used by a panelist in duplicate wear.

The example model trainer circuitry 202 determines whether the duplicate wear classifications of the model output satisfy a threshold. (Block 308). For example, the example model trainer circuitry 202 may determine whether the percentage of meters that the version of the ML model from block 304 accurately classifies as exhibiting or not exhibiting duplicate wear is greater or equal to a value that the example AME determines to be sufficiently accurate.

If the example model trainer circuitry 202 determines the duplicate wear classifications of the model output do not satisfy a threshold (Block 308: No), the example machine readable instructions and/or operations 300 return to block 304, where the example model trainer circuitry 202 makes a new version of the model. When making the new version of the model in a second iteration of block 304, may adjust the parameters based on the results from the first iteration of block 306. If the example model trainer circuitry 202 determines the duplicate wear classifications of the model output do satisfy a threshold (Block 308: Yes), the machine readable instructions and/or operations 300 end.

Figure 4:
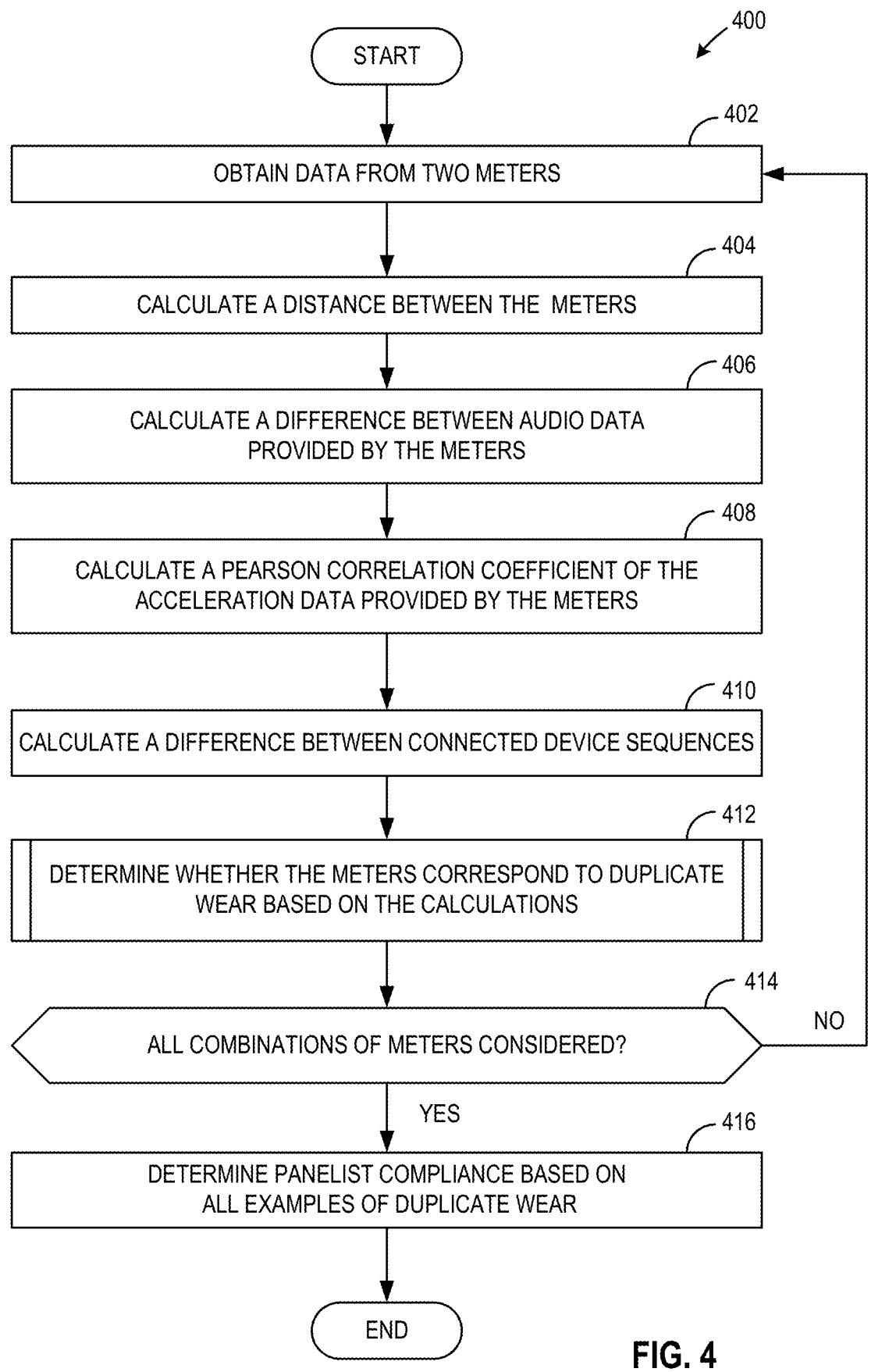
FIG. 4 is a flowchart representative of example machine readable instructions and/or example operations that may be executed by example processor circuitry to implement the example compliance determiner circuitry of FIG. 2.

FIG. 4 is a flowchart representative of example machine readable instructions and/or example operations 400 that may be executed and/or instantiated by processor circuitry to execute a ML model to detect duplicate wear. While the flowchart of FIG. 4 describes execution of a ML model using data from only two maters, in practice the example machine readable instructions and/or example operations 400 may be applied to any number of meters greater than two.

The example machine readable instructions and/or example operations 400 begin when the example interface circuitry 206 obtains data from two meters. (Block 402). The data obtained at block 402 may include any type of data produced by a wearable meter device as described previously.

The example comparator circuitry 208 calculate a distance between the meters. (Block 404). To calculate a distance, the example comparator circuitry may determine the location data of the first meter of block 402 to the location data of the second meter of block 402. The distance may be described in any appropriate units and may be based on the resolution of the location data.

The example comparator circuitry 208 calculate a difference between audio data provided by the meters. (Block 406). The example comparator circuitry 208 may make any type of signal processing technique to determine a difference between audio data. Examples of signal processing techniques that may be used by the example comparator circuitry 208 may include but are not limited to echo cancellation, resampling, equalization, filtering, etc. In some examples, the example comparator circuitry 208 analyzes media signature data at block 406 to calculate a difference between audio data from the meters.

The example comparator circuitry 208 calculates a PCC based on the acceleration data from the meters. (Block 408). The PCC describes how the acceleration data from the first meter of block 402 is linearly correlated to the acceleration data from the second meter of block 402.

The example comparator circuitry 208 calculates a difference between connected device sequences of the meters. (Block 410). For example, the comparator circuitry 208 may identify the differences between a first list of connected devices recorded in the short-range wireless communication data of the first meter of block 402 and a second list of connected devices recorded in the short-range wireless communication data of the second meter of block 402.

The example model executor circuitry 210 determines whether the meters of block 402 correspond to duplicate wear based on the calculations of blocks 404, 406, 408, 410. (Block 412). The example model executor circuitry 210 may execute any type of ML model to determine duplicate wear. Example operations that may be performed by the example machine readable instructions and/or operations 400 at block 412 are described further in FIGS. 5, 6.

In some examples, the example machine readable instructions and/or operations 400 may receive a subset of the possible types of data from the example meters at block 402. In such examples, the example model executor circuitry 210 determines whether the meters of block 402 correspond to duplicate wear based on the calculations of a subset of blocks 404, 406, 408, 410 that were executed based on the received data.

The example model executor circuitry 210 determines whether all combinations of meters have been considered. (Block 414). In some examples, the example compliance determiner circuitry 108 may analyze panelist compliance in a group such as a household. In some examples with n panelists in a group, the example compliance determiner circuitry 108 may make $$\binom{n}{2}$$

analyses to determine panelist compliance, as illustrated in the flowchart of FIG. 4. In other examples with n panelists in a group, the example compliance determiner circuitry 108 may make a different number of analyses to determine panelist compliance. For example, the example compliance determiner circuitry 108 may only consider a subset of the possible combinations of meters at block 414. In such examples, the subset of combinations may be provided by the example central facility 112 and stored in the model memory 204.

In the illustrative example of FIG. 1, n=3 and the example compliance determiner circuitry 108 makes 3 choose 2

$$\left(\text{i.e.,}\binom{3}{2}=3\right)$$

analyses. Specifically, the example machine readable instructions and/or operations 400 may execute blocks 402 through 412 in a first iteration to determine that example meters 104A, 104B do not collectively correspond to duplicate wear (i.e., meters 104A, 104B are not worn by the same panelist). The example machine readable instructions and/or operations 400 may then execute the foregoing blocks in a second iteration to determine example meters 104A, 104C do not collectively correspond to duplicate wear, followed by a third iteration to determine example meters 104B, 104C do correspond to duplicate wear.

If all combinations of meters have not been considered (Block 414: No), the example machine readable instructions and/or operations 400 return to block 402, where the interface circuitry 206 provides a different combination of two meters to the example model executor circuitry 210. While example block 414 and its accompanying description describe the sequential analyses of pairs of meters, in other some examples, the example model executor circuitry 210 may perform one or more analyses of pairs of meters in parallel.

If all combinations of meters have been considered (Block 414: Yes), the example model executor circuitry 210 determines panelist compliance based on all examples of duplicate wear. (Block 416). For example, after the three iterations described previously in reference to the illustrative example of FIG. 1, the example machine readable instructions and/or operations 400 may determine that example panelists 102B, 102C are non-compliant with AME requirements, and that example panelist 102A is compliant. The example model executor circuitry 210 may use panelist to meter correspondence information provided by the example AME to implement block 416. The machine readable instructions and/or operations 400 end after block 416.

Figure 5:
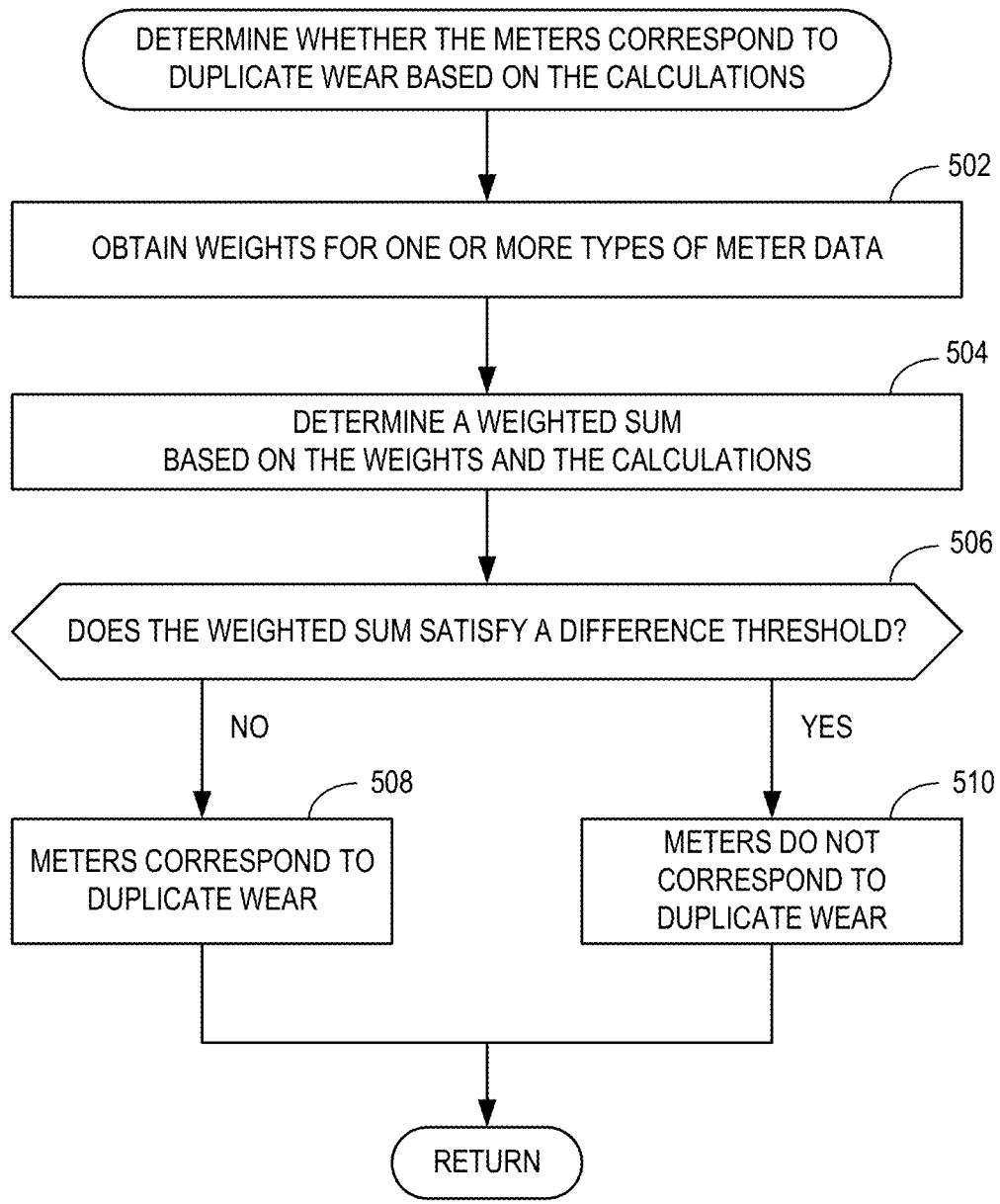
FIG. 5 is a flowchart representative of first example machine readable instructions and/or example operations that may be executed by example processor circuitry to determine meter compliance as described in FIG. 4.

FIG. 5 is a flowchart representative of first example machine readable instructions and/or example operations that may be executed by example processor circuitry to determine meter compliance as described in FIG. 4. Specifically, FIG. 5 shows a first set of operations that the example machine readable instructions and/or operations 400 may implement at block 412.

The flowchart of FIG. 5 begins when the example model executor circuitry 210 obtains weights for one or more types of meter data. (Block 502). For example, the example model executor circuitry 210 may obtain weights for one or more of the location data, acceleration data, audio data, and short-range wireless communication data from the example meters 104A, 104B, 104C. In some examples, the example model executor circuitry 210 may obtain at least one weight for a primary factor and may additionally obtain a second weight for a secondary factor. A weight used by the example model executor circuitry 210 is a value that represents the relative importance of each type of data. For example, if a first weight for a first type of meter data is greater than a second weight for a second type of meter data, the first type of meter data may make a greater impact on determining whether the duplicate meter devices correspond to duplicate wear. Accordingly, in some examples, primary factors may have larger weights than secondary factors. The example model executor circuitry 210 may obtain the weights of block 502 from the model memory 204. In turn, the example model trainer circuitry 202 may store the weights in memory if the corresponding model version satisfies an accuracy threshold (e.g., the threshold of block 308). In some examples, the example model executor circuitry 210 may obtain weights for only some of the types of meter data.

The example model executor circuitry 210 determines a weighted sum based on the weights of block 502 and the calculations of blocks 404, 406, 408, 410. (Block 504). The weighted sum may generally be described by equation (1):

$$\text{weighted sum} = \Sigma_{i=1}^{m} w_i v_i \qquad (1)$$

In equation (1), n refers to the number of types of meter data, i refers to an index, $w_i$ refers to the weight assigned to the ith type of meter data, and $v_i$ refers to a value that represents the difference between two sets of data that are the same type of data but correspond to different meters. For example, in the example flowchart of FIG. 4, i=1 may correspond to location data, i=2 may correspond to audio data, i=3 may correspond to acceleration data, and i=4 may correspond to short-range wireless communication data. In such examples, $v_1$, $v_2$, $v_3$, $v_4$, represents a numerical the output of blocks 404, 406, 408, 410, respectively. For example, $v_1$ may be a distance between two meters, $v_2$ may represent the number of unique characteristics that were identified in the audio data of one but not both meters, $v_3$ may be the PCC of the two meters, and $v_4$ may represent the number of times that the short-range wireless communication data indicated the meters connected to the same device at a same or similar time stamp. Furthermore, the example model trainer circuitry 202 may select the values $w_i$ to reflect both (a) the relative importance of one type of meter data over another and (b) the different units that each value $v_i$ may be recorded in, based on the corresponding type of data.

The example model executor circuitry 210 may apply weights of any value to a particular weighted sum. In some examples, the model executor circuitry 210 may apply weights for specific pairs of meters based on the composition and age group of the corresponding panelists. Additionally or alternatively, the example model executor circuitry 210 may additionally or alternatively apply weights for specific pairs of meters based on the timing of when the interface circuitry 206 obtains data from the pair of meters. The example model trainer circuitry 202 may provide a set of rules that the example model executor circuitry 210 executes to apply weights. In some example described above and herein, applying weights may refer to the multiplication of a weight to a particular parameter.

In a first example of weight application, the example model executor circuitry 210 may access the example model memory 204 to determine a first meter corresponds to a younger panelist and a second meter corresponds to an older panelist. In such examples, the example model executor circuitry 210 may increase the weight assigned to the PCC value from block 408 because panelists of a different age are more likely to have different levels of physical activity than two panelists closer in age. Accordingly, the acceleration data from the meters of two panelists with different ages may be more likely to have significant differences than the acceleration data from meters of two panelists that are closer in age.

In a second example of weight application, the example model executor circuitry 210 may access the example model memory 204 to determine a first meter corresponds to a child panelist and a second meter corresponds to an adult panelist. In such examples, the example model executor circuitry 210 may increase the weights assigned to location data obtained during evening hours because the child panelist may be more likely to be in their household in the evening than the adult panelist. As a result, two meters that both reported location data in the evening, in public, and in close proximity to one another may be a stronger indication of duplicate wear with a child panelist's meter and an adult panelist's meter than duplicate wear with two adult panelists' meters.

In a third example of weight application, the example model executor circuitry 210 may access the example model memory 204 to again determine a first meter corresponds to a child panelist and a second meter corresponds to an adult panelist. In such examples, the example model executor circuitry 210 may increase the weights assigned to audio data with meter signatures that correspond to adult content (e.g., media rated PG-13, rated R, etc.) because a child may be less likely to consume adult content for extended periods than an adult. As a result, media signatures of the same adult content generated by both a child panelist meter and adult panelist meter may be more likely to correspond to duplicate wear than media signatures of the same adult content generated by two adult panelist meters.

The example model executor circuitry 210 determines whether the weighted sum of block 504 satisfies a difference threshold. (Block 506). The manner in which a weighted sum satisfies the difference threshold may be determined by the type of weighted sum set by the example model trainer circuitry 202. For example, suppose the values of $v_i$ correspond to the foregoing descriptions, and that $w_i$ are positive values such that differences in meter data increase the value of the weighted sum. In such examples, the two meters that are engaged in duplicate wear may produce a higher weighted sum than two meters that are not. Accordingly, to satisfy the difference threshold of block 506 in such examples, the model executor circuitry 210 may determine whether the weighted sum is greater or equal to a value pre-determined by the example model trainer circuitry 202.

Alternatively, suppose the values of $v_i$ correspond to the foregoing descriptions, and that $w_i$ are negative values such that differences in meter data decrease the value of the weighted sum. In such examples, the two meters that are engaged in duplicate wear may produce a lower weighted sum than two meters that are not. Accordingly, to satisfy the difference threshold of block 506 in such examples, the model executor circuitry 210 may determine whether the weighted sum is less than or equal to a value pre-determined by the example model trainer circuitry 202.

If the model executor circuitry 210 determines the weighted sum does not satisfy the difference threshold (Block 506: No), the example model executor circuitry 210 reports that the meters correspond to duplicate wear. (Block 508). Alternatively, if the model executor circuitry 210 determines the weighted sum does satisfy the difference threshold (Block 506: Yes), the example model executor circuitry 210 reports that the meters correspond to duplicate wear. (Block 510). The example machine readable instructions and/or operations 400 return to block 414 after either of block 508 or 510.

In some examples, the example compliance determiner circuitry 108 may determine similarities between meter data at blocks 404, 406, 408, 410 instead of differences. In such examples, the weighted sum of block 504 would increase or decrease based on how similar each type of meter data is and based on the corresponding weights $w_i$. Accordingly, in such examples, the example machine readable instructions and/or operations 400 may compare the weighted sum to a similarity threshold at block 506 rather than a difference threshold as described in FIG. 5. In such examples, the example model executor circuitry 210 may determine the meters do correspond to duplicate wear when the weighted sum satisfies the similarity threshold. Similarly, in such examples, the example model executor circuitry 210 may determine the meters do not correspond to duplicate wear if the weight sum fails to satisfy the similarity threshold.

Figure 6:
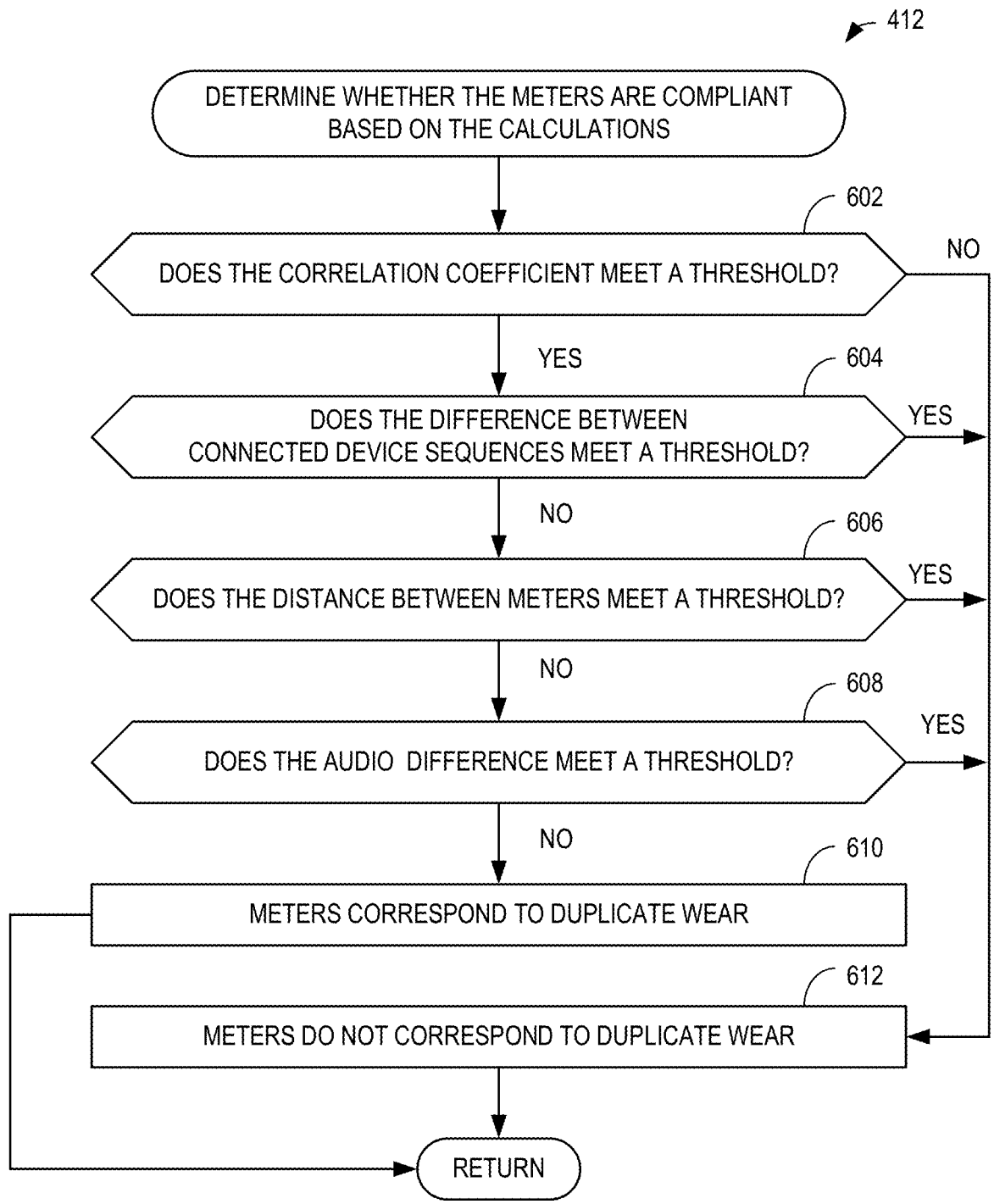
FIG. 6 is a flowchart representative of second example machine readable instructions and/or example operations that may be executed by example processor circuitry to determine meter compliance as described in FIG. 4.

FIG. 6 is a flowchart representative of second example machine readable instructions and/or example operations that may be executed by example processor circuitry to determine meter compliance as described in FIG. 4. Specifically, FIG. 6 shows a second set of operations that the example machine readable instructions and/or operations 400 may implement at block 412.

The flowchart of FIG. 6 begins when the example model executor circuitry 210 determines whether the PCC of the meters meets a threshold. (Block 602). As described in connection with FIGS. 7, 8, 9, the example comparator circuitry 208 may produce a PCC value at block 408 that increases when audio data between meters is more similar. As such, if the PCC of the meters does not meet the threshold (Block 602: No), the example machine readable instructions and/or operations 400 may proceed to block 612.

If the PCC of the meters does meet a threshold (Block 602: Yes), the example model executor circuitry 210 may determine whether a difference between the connected device sequences meets a threshold. (Block 604). The threshold of block 604 may be described as a number of differences in the connected device sequences that occur within a window of time. In such a difference threshold, the window of time may be sufficiently small to avoid inadvertent classification of duplicate wear. If the difference between connected device sequences meets the threshold (Block 604: Yes), the example machine readable instructions and/or operations 400 may proceed to block 612. The example model executor circuitry 210 may analyze primary factors at blocks 602, 604 before secondary factors at blocks 606, 608 because some primary data readings may enable the model executor circuitry 210 to confidently classify the meters as not engaged in duplicate wear without additional analysis.

In other examples, the threshold of block 604 may describe a number of similarities in the connected device sequences that occur within a window of time rather than a number of differences. The window of time in a similarity threshold may be sufficiently large such that situations with valid uses of wearable meter devices are not inadvertently categorized as duplicate wear. For example, the model executor circuitry 210 may determine connected device sequences that are significantly similar for three hours or less do not pass a similarity threshold at block 604 because two panelists, both of whom are wearing their own meters, may reasonably record similar short-range wireless communication data while consuming media because they are in the same environment (e.g., a room of a home, a car, etc.) for three or less hours. As a result, the two meters may have the same devices available for connection for three or less hours while not being engaged in duplicate wear. In contrast, the model executor circuitry 210 may determine connected device sequences that are significantly similar for more than three hours do pass a similarity threshold at block 604 because two panelists wearing their own meters are less likely to record similar short-range wireless communication data for such an extended period. The exact threshold of block 604 may be stored in the model memory 204 by the central facility 112 and may be set at any number.

If the difference between connected device sequences does not meet the threshold (Block 604: No), The example model executor circuitry 210 determines may determine whether the distance between the meters satisfies a threshold. (Block 606). If the distance between the meters meets a threshold (Block 606: Yes), the example machine readable instructions and/or operations 400 may proceed to block 612.

If the distance between the meters does not meet a threshold (Block 606: No), the example model executor circuitry 210 may determine whether the audio difference between meters meets a threshold. (Block 608). The type of threshold implemented in block 608 may depend on the output of block 406. For example, if the output of block 406 is a list of substantially different sections of media signatures from the meters over time, the audio difference threshold of block 608 may be met if the average number of substantial differences per unit of time is greater or equal to a threshold value. If the audio difference between meters meets the threshold (Block 608: Yes), the example machine readable instructions and/or operations 400 may proceed to block 612.

If the audio difference of the meters does not meet the threshold (Block 608: No), the example model executor circuitry 210 may determine the meters correspond to duplicate wear. (Block 610). The meters may be described as exhibiting duplicate wear because they have linearly correlated acceleration data, do not have significant differences in the connected device sequences, are not located significantly apart, and do not have significant audio data differences. The example machine readable instructions and/or operations 400 return to block 414 after block 610.

If the PCC of the meters does not meet a threshold (Block 602: No), the difference between connected devices does meet a threshold (Block 604: Yes), the distance between the meters meets a threshold (Block 606: Yes), or the audio difference between meters meets a threshold (Block 608: Yes), the example model executor circuitry 210 may classify the meters as not corresponding to duplicate wear. (Block 612). The example meters may be described as not exhibiting duplicate wear because they have at least one significant difference in meter data, indicating both meters are not worn by the same panelist. The example machine readable instructions and/or operations 400 return to block 414 after block 612.

The flowchart of FIG. 6 is one example of a decision tree that the example model executor circuitry 210 may implement. In other examples, the example model executor circuitry 210 may implement a different decision tree based on the outputs of block 404, 406, 408, 410. In such examples, the model trainer circuitry 202 may develop a decision tree in which one or more thresholds from blocks 602, 604, 606, 608 may be different, and the order of blocks 602, 604, 606, 608 may be different. In other examples, the example model executor circuitry 210 may implement an architecture other than a decision tree.

Figure 7:
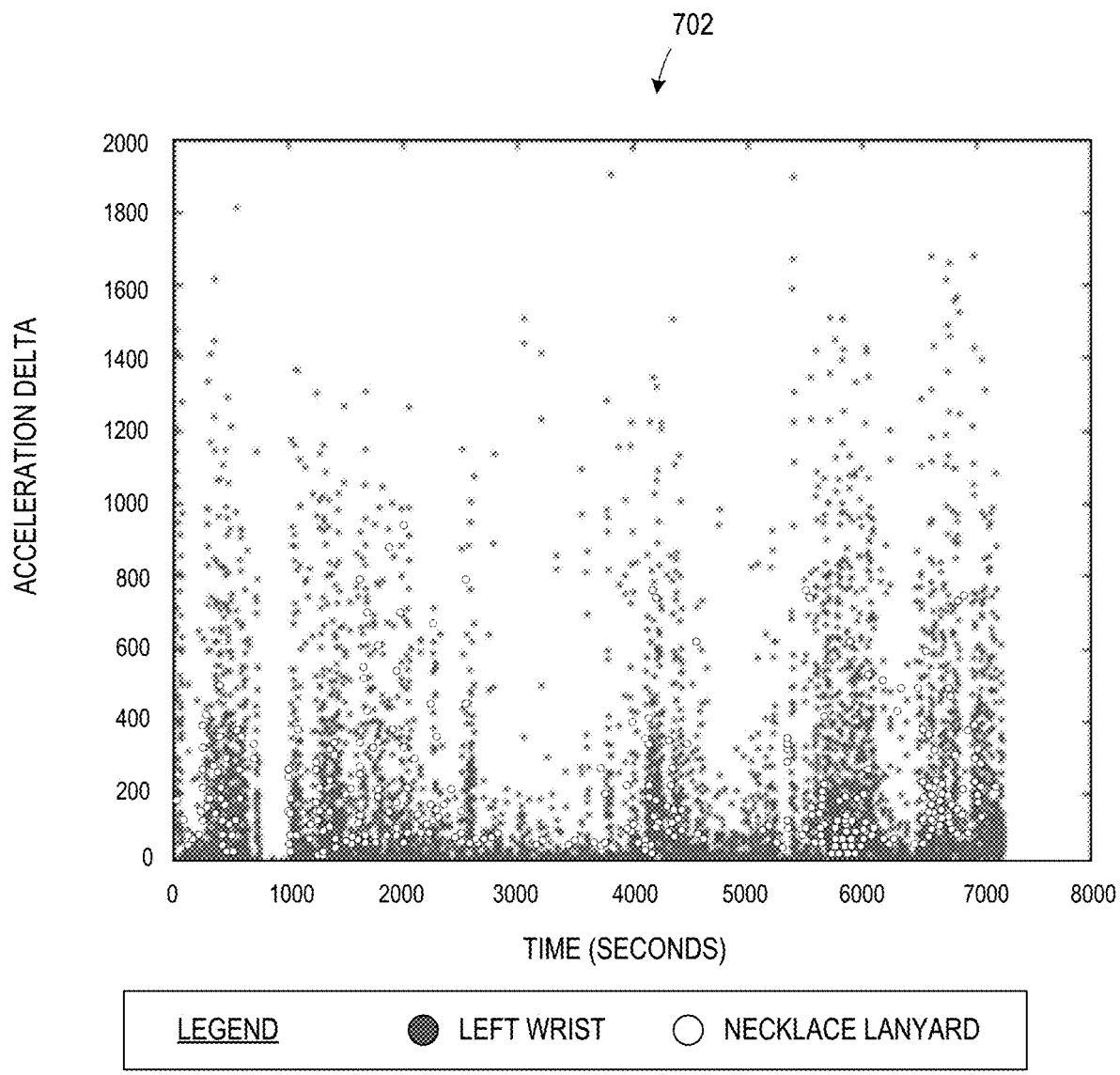
FIG. 7 is a graph describing acceleration data that may be received by the comparator circuitry of FIG. 2.

FIG. 7 is a graph describing acceleration data that may be received by the comparator circuitry of FIG. 2. FIG. 7 includes the example graph 702.

The example graph 702 is an example of acceleration data that may be obtained from two wearable meter devices exhibiting duplicate wear. The example graph 702 includes a first data set, taken from a first meter worn on a panelist's left wrist, and a second data set, taken from a meter worn by the panelist on a lanyard like a necklace.

The x axis of the example graph 702 shows time in seconds. In the illustrative example of FIG. 7, the example model executor circuitry 210 may use all the data from the example graph 702 to generate a single PCC that represents a two-hour window. In other examples, a single PCC may correspond to a different amount of acceleration data.

The y axis of the example graph 702 shows a magnitude of a difference between two adjacent acceleration recordings. In some examples, the magnitude of the difference between two adjacent acceleration recordings may be referred to as a delta. The delta described on the y axis may be described by equation (2):

$$\Delta(t)=|P(t)-P(t-1)| \qquad (2)$$

In equation (2), P(t) refers to the acceleration vector recorded at a current timestamp t, and P (t−1) refers to the acceleration vector recorded at a previous time stamp, t−1. To determine a PCC from the data in the example graph 702, the example comparator circuitry 208 may implement equation (3):

$$r_{xy} = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}-(y_i - \bar{y})^2}} \qquad (3)$$

In equation (3), x(t) refers to the delta (Δ(t) from equation (2)) of the first meter over an amount of time, y(t) refers to the delta of the second meter over the same amount of time, $\bar{x}$ refers to the average delta of the first meter during the same amount of time, and $\bar{y}$ refers to the average delta of the second meter during the same amount of time. In some examples, the AME may correct for an amount of misalignment between the first meter and second meter. For example, to produce the example graph 702, the example comparator circuitry 208 corrected for a misalignment of five seconds between meters. In other examples, the first and second meters may be misaligned by a different amount of time. By combining equations (2) and (3) in such a manner, the example comparator circuitry 208 can combine to determine a PCC value that is normalized to a value between [−1, 1] and is independently invariant to the scale and offset transformations of x(t) and y(t).

Advantageously, the example graph 702 illustrates that the example interface circuitry 206 obtains finer grain acceleration data than previous solutions to detect duplicate wear. For example, while previous solutions may have recorded approximately 720 acceleration data points over a two hour span (at a rate of approximately 0.1 samples per second), the example graph 702 shows that the interface circuitry 206 may obtain approximately 7200 acceleration data points over a two hour span (at a rate of approximately 1 sample per second). The increased resolution (i.e. finer grain) of acceleration data obtained by the example interface circuitry 206 allows the example comparator circuitry 208 to calculate PCC values that may be used to distinguish between duplicate wear and non-duplicate wear more accurately than previous solutions.

Figure 8:
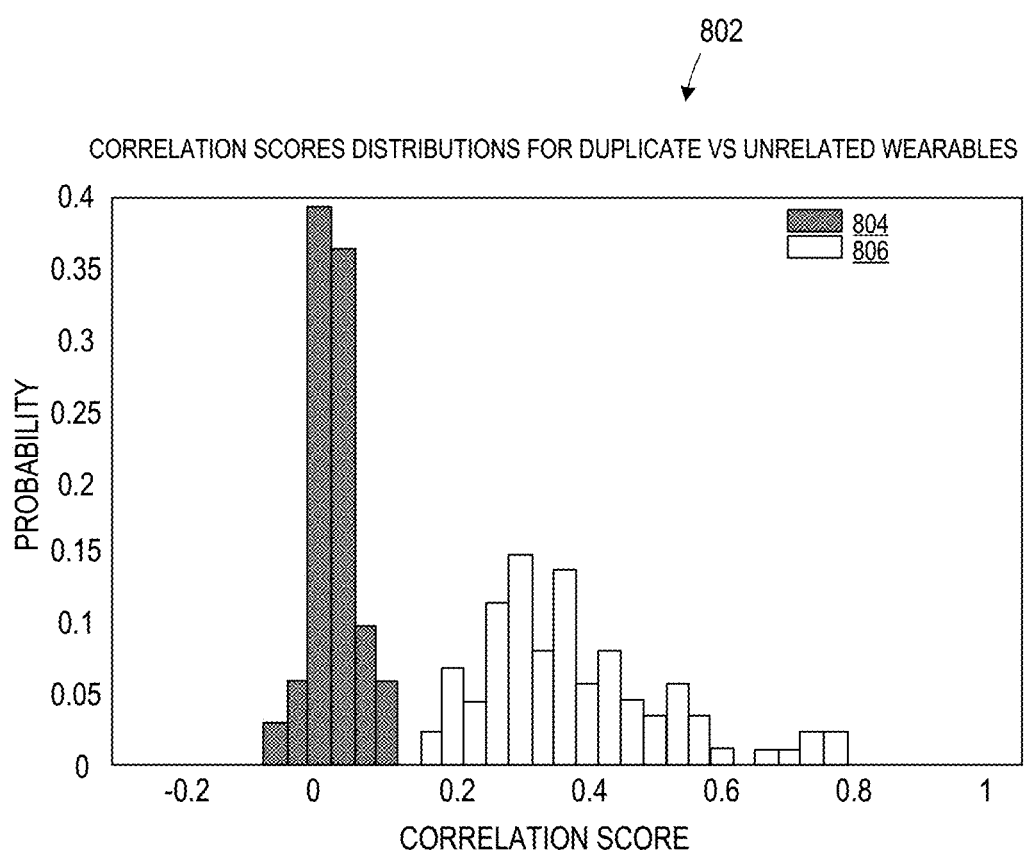
FIG. 8 is a graph describing how the output of the comparator circuitry of FIG. 2 changes based on duplicate wear data and single wear data.

FIG. 8 is a graph describing how the output of the comparator circuitry of FIG. 2 changes based on duplicate wear data and single wear data. FIG. 8 includes an example graph 802. The example graph includes example data sets 804, 806.

The example graph 802 is a histogram of PCC values for various pairs of wearable meter devices. The x axis of the example graph 802 shows PCC values, which may additionally or alternatively be referred to as a correlation score. A given PCC may be any number between [−1, 1]. In the example graph 802, the x axis is divided into bins that each have a width of 1/30. The y axis of the example graph 802 shows the probability that a pair of meters from a particular data set has a PCC score within a particular bin of the histogram. For example, the bin centered around 0 on the x axis indicates that approximately 39% of all meter pairs recorded in the example data set 804 have a PCC between [−1/60, 1/60].

The example data set 804 represents PCC values from pairs of wearable meter devices that are unrelated. That is, each PCC value in the example data set 804 represents two wearable meter devices that were not worn by the same panelist. The example graph 802 shows that, in the illustrative example of FIG. 8, each pair of unrelated wearable devices had a PCC value between [−5/60, 7/60]. The low magnitude PCC values in the example data set 804 may correspond to the fact that wearable meter devices worn on different panelists may typically create acceleration profiles that are significantly different and therefore exhibit low linear correlation.

The example data set 806 represents the PCC values from pairs of wearable meter devices that exhibit duplicate wear. The example graph 802 shows that, in the illustrative example of FIG. 8, each pair of duplicate wearable devices had a PCC value between [9/60, 47/60]. In comparison to the example data set 804, the higher magnitude PCC values in the example data set 806 may correspond to the fact that wearable meter devices worn by the same panelist may typically create acceleration profiles that are significantly similar and therefore exhibit high linear correlation.

The example graph 802 shows example PCC values that may be determined from training data in the example data store 110. In the illustrative example of FIG. 8, the example data sets 804, 806 are mutually exclusive in the sense that data set did not include any overlapping PCC values. In practice, however, unknown meter data from the example meter 104A, 104B, 104C, or other wearable meter devices may have both duplicate wear PCC values and unrelated PCC values that overlap. As a result, the example model trainer circuitry 202 may develop a model that uses PCC values produced by the comparator circuitry 208 as one of many factors to detect duplicate wear. Furthermore, the example model trainer circuitry 202 may determine a weight or adjust a decision tree based on the amount of overlapping PCC values that are identified in either the training meter data or unknown meter data.

Figure 9:
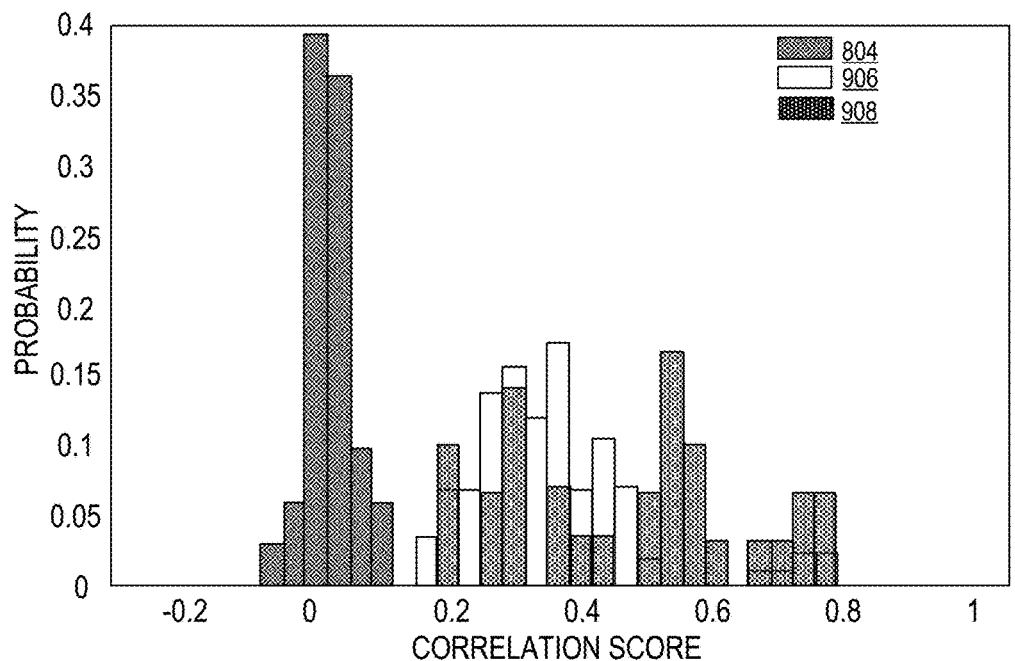
FIG. 9 is a graph describing how the output of the comparator circuitry of FIG. 2 changes based on different types duplicate wear data.
Figure 9:
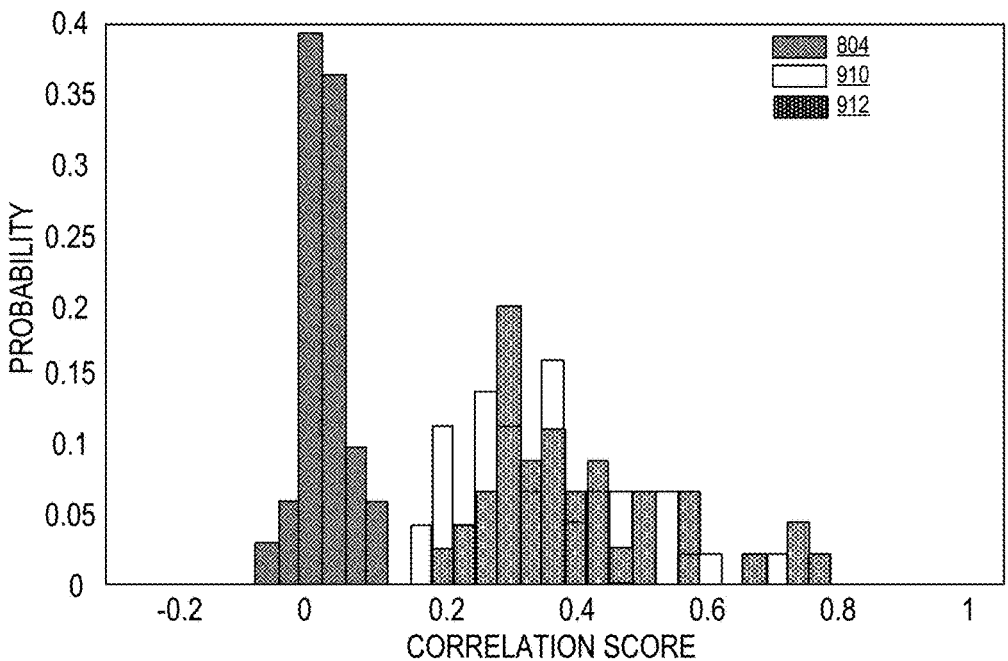

FIG. 9 is a graph describing how the output of the comparator circuitry of FIG. 2 changes based on different types duplicate wear data. FIG. 9 includes example graphs 902, 904. The example graph 902 includes example data sets 804, 906, 908. The example graph 904 includes example data sets 804, 910, 912.

Like the example graph 802, the example graphs 902, 904 are both histograms that show PCC values for different pairs of wearable meter devices. The x axes of the example graphs 902, 904 are also divided into bins with a width of 1/30. The y axes of the example graphs 902, 904 also show the probability that a pair of meters from a particular data set has a PCC score within a particular bin of the histogram.

The example data set 906 shows PCC values from pairs of wearable meter devices that exhibit duplicate wear, and where at least one of the two wearable meter devices was worn on the panelist's wrist. The example graph 902 shows that, in the illustrative example of FIG. 9, all pairs of meters within the example data set 906 had PCC values between [9/60, 31/60].

The example data set 908 shows PCC values from pairs of wearable meter devices that exhibit duplicate wear, and where neither of the two wearable meter devices were worn on the panelist's wrist. The example graph 902 shows that, in the illustrative example of FIG. 9, all pairs of meters within the example data set 908 had PCC values between [11/60, 47/60].

The example data set 910 shows PCC values from pairs of wearable meter devices that exhibit duplicate wear, and where the panelist exhibits low amounts of activity. Examples of low amounts of activity could include, but are not limited to, times when the panelist is reading, sitting, watching television, laying, seeping, working on a computer and/or working at a desk, etc. The example graph 904 shows that, in the illustrative example of FIG. 9, all pairs of meters within the example data set 910 had PCC values between [9/60, 47/60].

The example data set 912 shows PCC values from pairs of wearable meter devices that exhibit duplicate wear, and where the panelist exhibits normal or mixed amounts of activity. Examples of normal or mixed amounts of activity could include, but are not limited to, times when the panelist is walking, eating, watching television, working on a computer and/or working at a desk, shopping, driving, etc. The example graph 904 shows that, in the illustrative example of FIG. 9, all pairs of meters within the example data set 912 had PCC values between [9/60, 47/60].

FIG. 9 shows how the example data set 806, which includes the superset of pairs of wearable meter devices that exhibit duplicate wear, can be decomposed into subsets. Specifically, the example data sets 906, 908, 910, 912 are each subsets of the data set 806, and each subset describes a different wearable configuration or activity level a panelist may exhibit while wearing two wearable meter devices. If an example AME determines that information describing the type of wearable meter device or activity level exhibited by panelists engaged in duplicate wear is valuable, the example model trainer circuitry 202 may develop a model such that the example model executor circuitry 210 uses PCC values to further categorize the wearable configuration and/or activity level of any detected duplicate wear. Advantageously, the example data sets 906, 908, 910, 912 are each mutually exclusive from the example data set 804. As a result, the example model executor circuitry 210 may use the PCC values as a factor to accurately determine whether an unknown pair of wearable meter devices exhibit duplicate wear.

Figure 10:
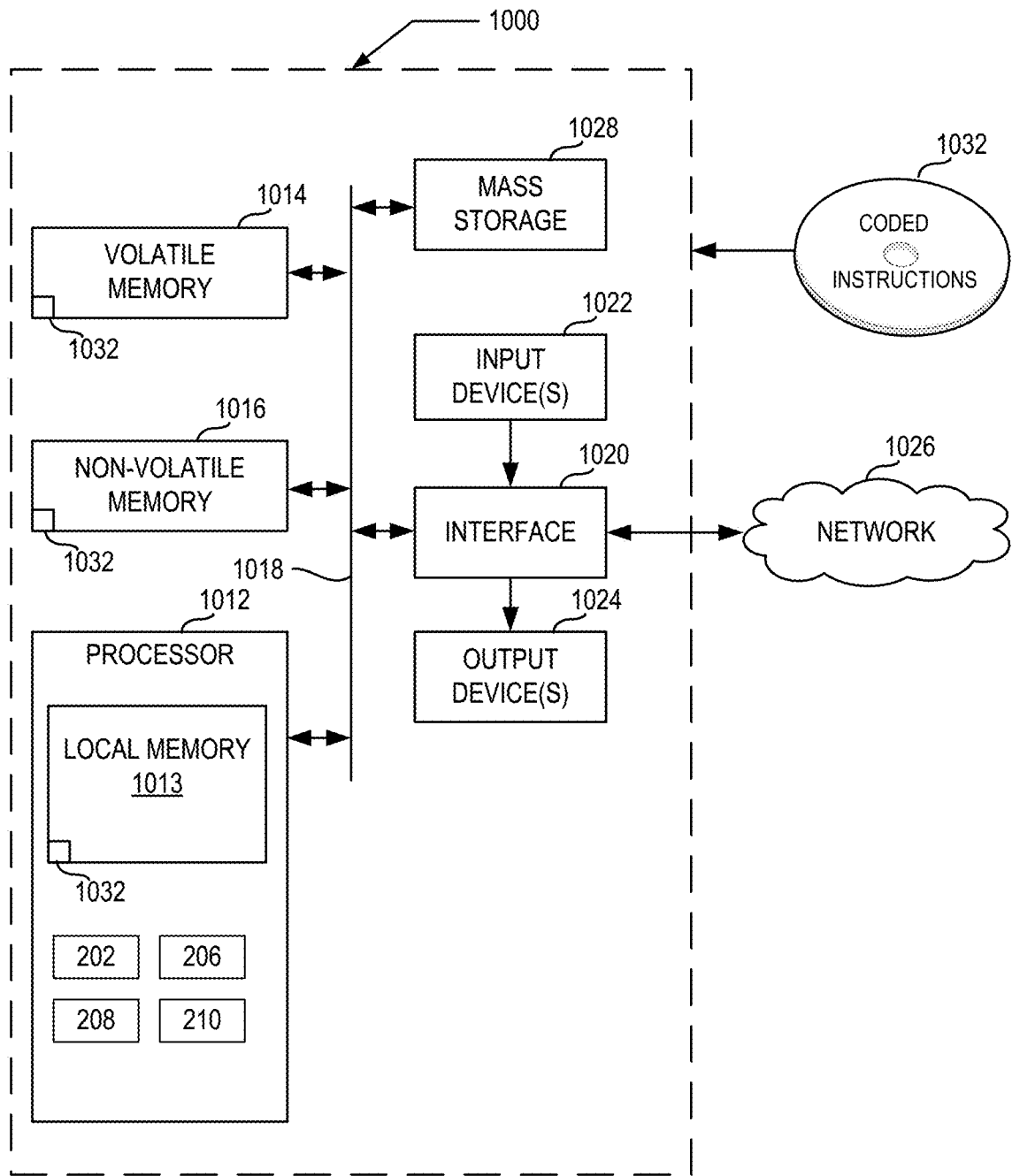
FIG. 10 is a block diagram of an example processing platform including processor circuitry structured to execute the example machine readable instructions and/or the example operations of FIGS. 3, 4, 5, 6 to implement the example compliance determiner circuitry of FIG. 2.

FIG. 10 is a block diagram of an example processor platform 1000 structured to execute and/or instantiate the machine readable instructions and/or the operations of FIGS. 3, 4, 5, 6 to implement the example compliance determiner circuitry 108 of FIG. 1. The processor platform 1000 can be, for example a personal video recorder, a set top box, a headset (e.g., an augmented reality (AR) headset, a virtual reality (VR) headset, etc.) or other wearable meter device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs, microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the example model trainer circuitry 202, the example interface circuitry 206, the example comparator circuitry 208, the example comparator circuitry 208, and the example model executor circuitry 210.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a touchscreen, a track-pad, an isopoint device, and/or a voice recognition system.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1032, which may be implemented by the machine readable instructions of FIGS. 3, 4, 5, 6, may be stored in the mass storage device 1028, in the volatile memory 1014, in the non-volatile memory 1016, and/or on a removable non-transitory computer readable storage medium such as a CD or DVD.

Figure 11:
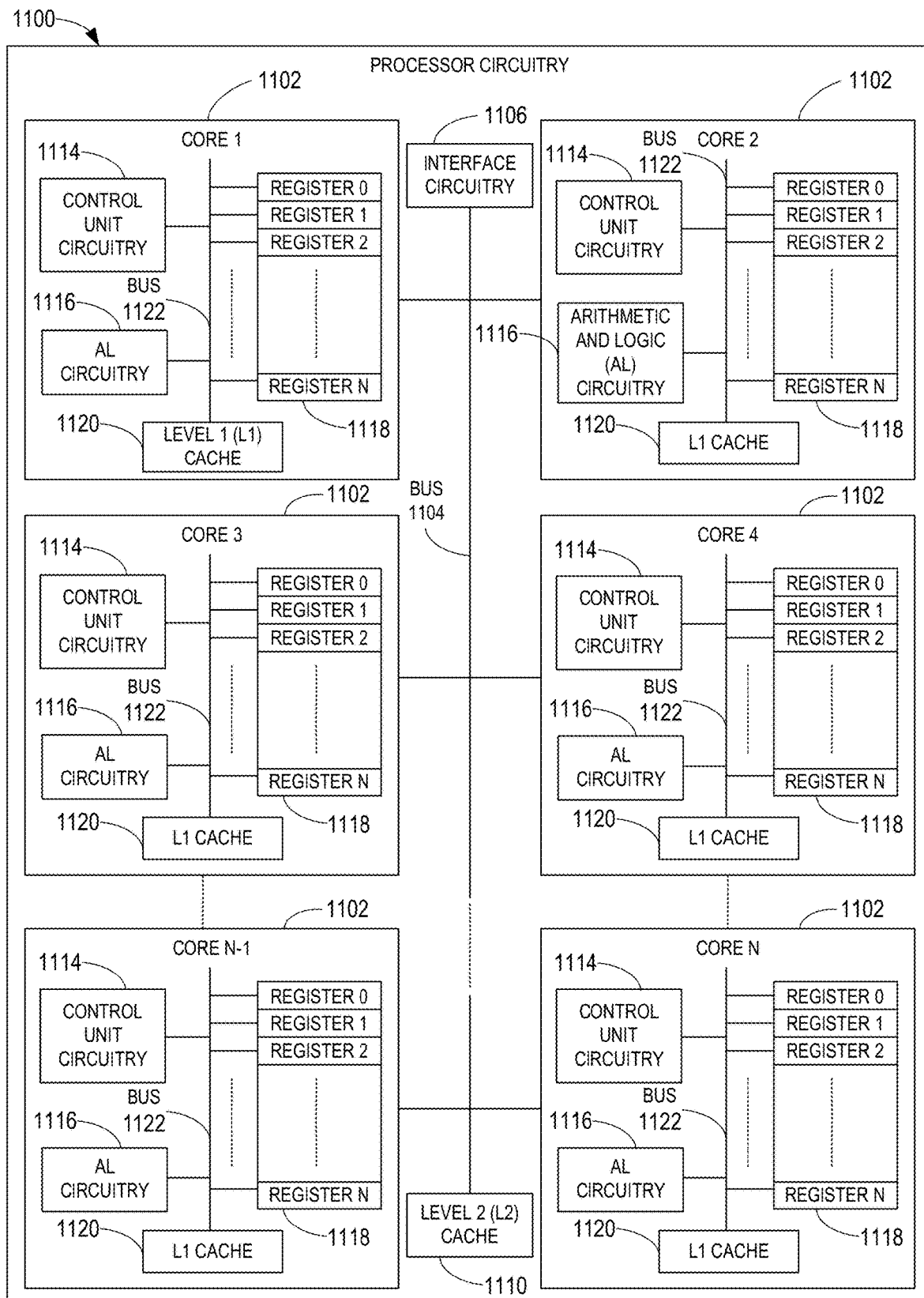
FIG. 11 is a block diagram of an example implementation of the processor circuitry of FIG. 10.

FIG. 11 is a block diagram of an example implementation of the processor circuitry 1012 of FIG. 10. In this example, the processor circuitry 1012 of FIG. 10 is implemented by a microprocessor 1100. For example, the microprocessor 1100 may be a general purpose microprocessor (e.g., general purpose microprocessor circuitry). The microprocessor 1100 executes some or all of the machine readable instructions of the flowcharts of FIGS. 3, 4, 5, 6 to effectively instantiate the compliance determiner circuitry 108 of FIG. 2 as logic circuits to perform the operations corresponding to those machine readable instructions. In some such examples, the circuitry of FIG. 2 [er diagram] is instantiated by the hardware circuits of the microprocessor 1100 in combination with the instructions. For example, the microprocessor 1100 may be implemented by multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 3, 4, 5, 6.

The cores 1102 may communicate by a first example bus 1104. In some examples, the first bus 1104 may be implemented by a communication bus to effectuate communication associated with one(s) of the cores 1102. For example, the first bus 1104 may be implemented by at least one of an Inter-Integrated Circuit (I2C) bus, a Serial Peripheral Interface (SPI) bus, a PCI bus, or a PCIe bus. Additionally or alternatively, the first bus 1104 may be implemented by any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2 cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the local memory 1120, and a second example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The second bus 1122 may be implemented by at least one of an I2C bus, a SPI bus, a PCI bus, or a PCIe bus Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
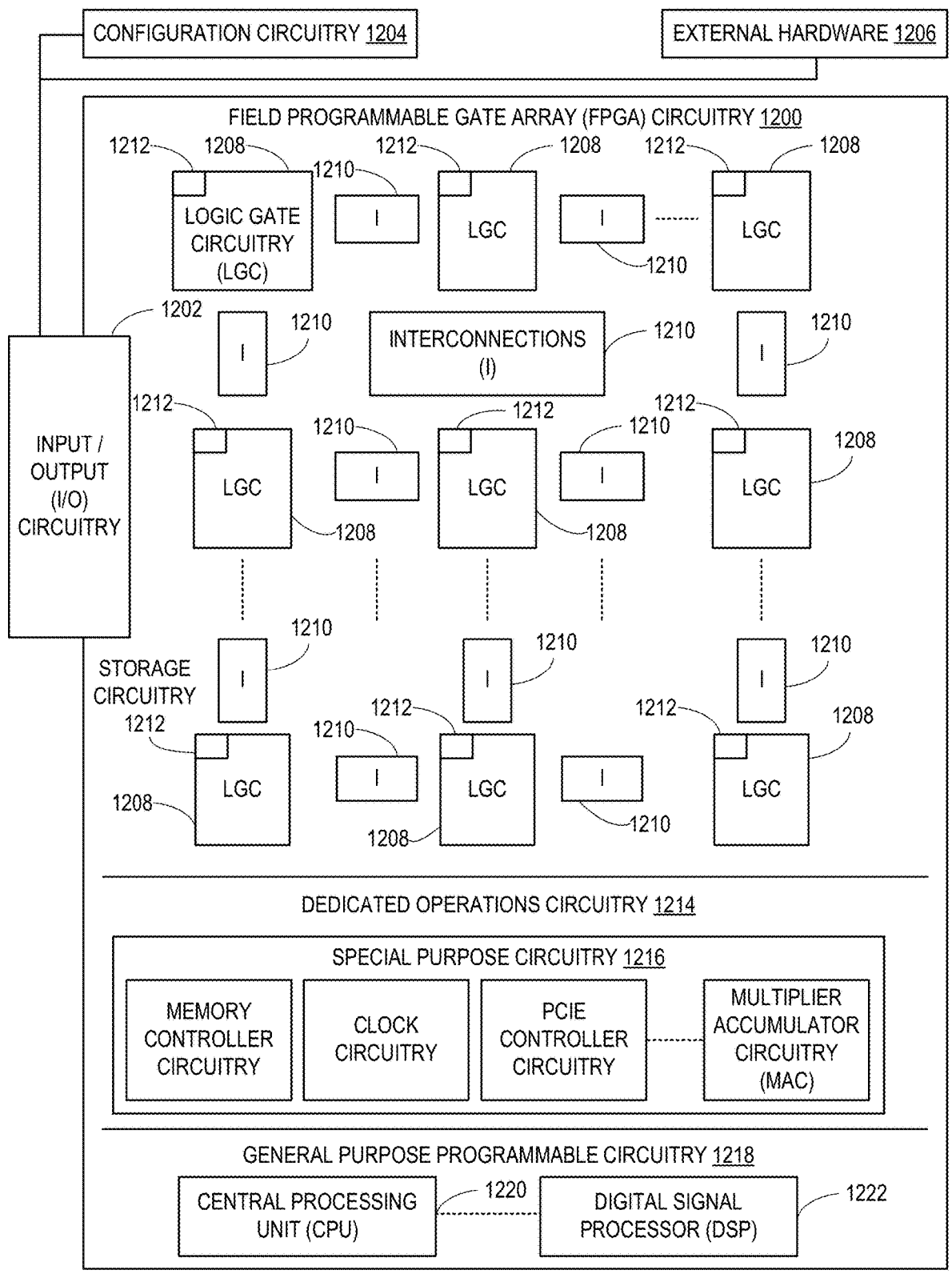
FIG. 12 is a block diagram of another example implementation of the processor circuitry of FIG. 10.

FIG. 12 is a block diagram of another example implementation of the processor circuitry 1012 of FIG. 10. In this example, the processor circuitry 1012 is implemented by FPGA circuitry 1200. For example, the FPGA circuitry 1200 may be implemented by an FPGA. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowcharts of FIGS. 3, 4, 5, 6 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowcharts of FIGS. 3, 4, 5, 6. In particular, the FPGA circuitry 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 3, 4, 5, 6. As such, the FPGA circuitry 1200 may be structured to effectively instantiate some or all of the machine readable instructions of the flowcharts of FIGS. 3, 4, 5, 6 as dedicated logic circuits to perform the operations corresponding to those software instructions in a dedicated manner analogous to an ASIC. Therefore, the FPGA circuitry 1200 may perform the operations corresponding to the some or all of the machine readable instructions of FIGS. 3, 4, 5, 6 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware 1206. For example, the configuration circuitry 1204 may be implemented by interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may be implemented by external hardware circuitry. For example, the external hardware 1206 may be implemented by the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and the configurable interconnections 1210 are configurable to instantiate one or more operations that may correspond to at least some of the machine readable instructions of FIGS. 3, 4, 5, 6 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The configurable interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 1012 of FIG. 10, many other approaches are contemplated. For example, as mentioned above, modern FPGA circuitry may include an on-board CPU, such as one or more of the example CPU 1220 of FIG. 12. Therefore, the processor circuitry 1012 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowcharts of FIGS. 3, 4, 5, 6 may be executed by one or more of the cores 1102 of FIG. 11, a second portion of the machine readable instructions represented by the flowcharts of FIGS. 3, 4, 5, 6 may be executed by the FPGA circuitry 1200 of FIG. 12, and/or a third portion of the machine readable instructions represented by the flowcharts of FIGS. 3, 4, 5, 6 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 1012 of FIG. 10 may be in one or more packages. For example, the microprocessor 1100 of FIG. 11 and/or the FPGA circuitry 1200 of FIG. 12 may be in one or more packages. In some examples, an XPU may be implemented by the processor circuitry 1012 of FIG. 10, which may be in one or more packages. For example, the XPU may include a CPU in one package, a DSP in another package, a GPU in yet another package, and an FPGA in still yet another package.

Figure 13:
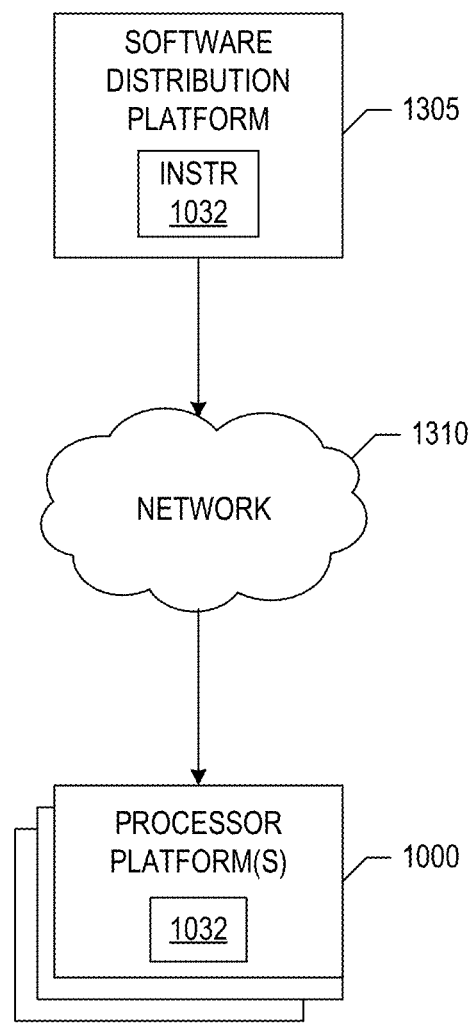
FIG. 13 is a block diagram of an example software distribution platform (e.g., one or more servers) to distribute software (e.g., software corresponding to the example machine readable instructions of FIG. 10) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 1032 of FIG. 10 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1032, which may correspond to the example machine readable instructions and/or operations 300, 400 of FIGS. 3, 4, 5, 6, as described above. The one or more servers of the example software distribution platform 1305 are in communication with an example network 1310, which may correspond to any one or more of the Internet and/or any of the example networks 106 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1032 from the software distribution platform 1305. For example, the software, which may correspond to the example machine readable instructions and/or operations 300, 400 of FIGS. 3, 4, 5, 6, may be downloaded to the example processor platform 1000, which is to execute the machine readable instructions 1032 to implement the example compliance determiner circuitry 108. In some examples, one or more servers of the software distribution platform 1305 periodically offer, transmit, and/or force updates to the software (e.g., the example machine readable instructions 1032 of FIG. 10) to ensure improvements, patches, updates, etc., are distributed and applied to the software at the end user devices.

From the foregoing, it will be appreciated that example systems, methods, apparatus, and articles of manufacture have been disclosed that detect wear in wearable meter devices that may be worn in a variety of wearable configurations. Disclosed systems, methods, apparatus, and articles of manufacture improve the efficiency of using a computing device by executing a ML model to detect duplicate wear based on a plurality of types of meter data that include, but are not limited to, location, acceleration, audio, and short-range wireless communication data. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to detect multiple wearable meter devices are disclosed herein. Further examples and combinations thereof include the following.

Example 1 includes an apparatus to detect multiple wearable meter devices, the apparatus comprising interface circuitry to receive primary data from a first meter and a second meter, the primary data including at least one of (a) acceleration data and (b) short-range wireless communication data, and receive secondary data from the first meter and the second meter, the secondary data including at least one of (a) location data and (b) audio data, comparator circuitry to determine one or more primary factors based on the primary data, the one or more primary factors to include (a) a correlation coefficient based on the acceleration data, and (b) a difference between connected device sequences based on the short-range wireless communication data, determine one or more secondary factors based on the secondary data, the one or more secondary factors to include (a) a distance between the first meter and the second meter based on the location data, and (b) a difference between the audio data, and model executor circuitry to determine, based on the one or more primary factors and the one or more secondary factors, whether the first meter and the second meter correspond to duplicate wear.

Example 2 includes the apparatus of example 1, wherein to determine whether the first meter and the second meter correspond to duplicate wear, the model executor circuitry is to compare a weighted sum to a threshold.

Example 3 includes the apparatus of example 2, wherein to compare the weighted sum to the threshold, the model executor circuitry is to apply at least one of a first weight to the correlation coefficient to produce a first value, and a second weight to the difference between short-range wireless communication sequences to produce a second value, apply at least one of a third weight to the distance between the first meter and the second meter to produce a third value, and a fourth weight to the difference between the audio data to produce a fourth value, and add at least two of the first value, the second value, the third value, and the fourth value together to produce the weighted sum.

Example 4 includes the apparatus of example 3, wherein the model executor circuitry is to obtain a first age of a first panelist corresponding to the first meter, obtain a second age of a second panelist corresponding to the second meter, and determine one or more of the first weight, the second weight, the third weight, and the fourth weight based on the first age and second age.

Example 5 includes the apparatus of example 3, wherein the model executor circuitry is to determine one or more of the first weight, the second weight, the third weight, and the fourth weight based on how values in the primary data and the secondary data change over a period of time.

Example 6 includes the apparatus of example 1, wherein the model executor circuitry is to implement a decision tree to determine whether the first meter and the second meter correspond to duplicate wear.

Example 7 includes the apparatus of example 1, wherein to determine the correlation coefficient, the comparator circuitry is further to measure a linear relationship between a change in the acceleration data from the first meter and the second meter over a period of time.

Example 8 includes the apparatus of example 1, wherein one or more of the first meter and the second meter may be worn on a wrist, around a neck, or on a waistband.

Example 9 includes the apparatus of example 1, wherein the audio data includes first audio data from the first meter and second audio data from the second meter, the first audio data corresponds to a first media signature, and the second audio data corresponds to a second media signature.

Example 10 includes the apparatus of example 1, wherein the first meter corresponds to a first panelist, the second meter correspond to a second panelist, and the first panelist and the second panelist are members of a shared household.

Example 11 includes a method to detect multiple wearable meter devices, the method comprising receiving primary data from a first meter and a second meter, the primary data including at least one of (a) acceleration data and (b) short-range wireless communication data, receiving secondary data from the first meter and the second meter, the secondary data including at least one of (a) location data and (b) audio data, determining one or more primary factors based on the primary data, the one or more primary factors to include (a) a correlation coefficient based on the acceleration data, and (b) a difference between connected device sequences based on the short-range wireless communication data, determining one or more secondary factors based on the secondary data, the one or more secondary factors to include (a) a distance between the first meter and the second meter based on the location data, and (b) a difference between the audio data, and determining, based on the one or more primary factors and the one or more secondary factors, whether the first meter and the second meter correspond to duplicate wear.

Example 12 includes the method of example 11, wherein determining whether the first meter and the second meter correspond to duplicate wear further includes comparing a weighted sum to a threshold.

Example 13 includes the method of example 12, wherein comparing the weighted sum to the threshold further includes applying at least one of a first weight to the correlation coefficient to produce a first value, and a second weight to the difference between connected device sequences to produce a second value, applying at least one of a third weight to the distance between the first meter and the second meter to produce a third value, and a fourth weight to the difference between the audio data to produce a fourth value, and adding at least two of the first value, the second value, the third value, and the fourth value together to produce the weighted sum.

Example 14 includes the method of example 13, further including obtaining a first age of a first panelist corresponding to the first meter, obtaining a second age of a second panelist corresponding to the second meter, and determining one or more of the first weight, the second weight, the third weight, and the fourth weight based on the first age and second age.

Example 15 includes the method of example 13, further including determining one or more of the first weight, the second weight, the third weight, and the fourth weight based on how values in the primary data and the secondary data change over a period of time.

Example 16 includes the method of example 11, wherein determining whether the first meter and the second meter are worn correspond to duplicate wear further includes implementing a decision tree.

Example 17 includes the method of example 11, wherein determining the correlation coefficient further includes measuring a linear relationship between a change in the acceleration data from the first meter and the second meter over a period of time.

Example 18 includes the method of example 11, wherein one or more of the first meter and the second meter may be worn on a wrist, around a neck, or on a waistband.

Example 19 includes the method of example 11, wherein the audio data includes first audio data from the first meter and second audio data from the second meter, the first audio data corresponding to a first media signature and the second audio data corresponding to a second media signature.

Example 20 includes the method of example 11, wherein the first meter corresponds to a first panelist, the second meter correspond to a second panelist, and the first panelist and the second panelist are members of a shared household.

Example 21 includes a non-transitory machine readable storage medium comprising instructions that, when executed, cause processor circuitry to at least receive primary data from a first meter and a second meter, the primary data including at least one of (a) acceleration data and (b) short-range wireless communication data, receive secondary data from the first meter and the second meter, the secondary data including at least one of (a) location data and (b) audio data, determine one or more primary factors based on the primary data, the one or more primary factors to include (a) a correlation coefficient based on the acceleration data, and (b) a difference between connected device sequences based on the short-range wireless communication data, determine one or more secondary factors based on the secondary data, the one or more secondary factors to include (a) a distance between the first meter and the second meter based on the location data, and (b) a difference between the audio data, and determine, based on the one or more primary factors and the one or more secondary factors, whether the first meter and the second meter correspond to duplicate wear.

Example 22 includes the non-transitory machine readable storage medium of example 21, wherein to determine whether the first meter and the second meter correspond to duplicate wear, the instructions cause the processor circuitry to compare a weighted sum to a threshold.

Example 23 includes the non-transitory machine readable storage medium of example 22, wherein to compare the weighted sum to the threshold, the instructions cause the processor circuitry to apply at least one of a first weight to the correlation coefficient to produce a first value, and a second weight to the difference between connected device sequences to produce a second value, apply at least one of a third weight to the distance between the first meter and the second meter to produce a third value, and a fourth weight to the difference between the audio data to produce a fourth value, and add at least two of the first value, the second value, the third value, and the fourth value together to produce the weighted sum.

Example 24 includes the non-transitory machine readable storage medium of example 23, wherein the instructions cause the processor circuitry to obtain a first age of a first panelist corresponding to the first meter, obtain a second age of a second panelist corresponding to the second meter, and determine one or more of the first weight, the second weight, the third weight, and the fourth weight based on the first age and second age.

Example 25 includes the non-transitory machine readable storage medium of example 23, wherein the instructions cause the processor circuitry to determine one or more of the first weight, the second weight, the third weight, and the fourth weight based on how values in the primary data and the secondary data change over a period of time.

Example 26 includes the non-transitory machine readable storage medium of example 21, wherein to determine whether the first meter and the second meter correspond to duplicate wear, the instructions cause the processor circuitry to implement a decision tree.

Example 27 includes the non-transitory machine readable storage medium of example 21, wherein to determine the correlation coefficient, the instructions cause the processor circuitry to measure a linear relationship between a change in the acceleration data from the first meter and the second meter over a period of time.

Example 28 includes the non-transitory machine readable storage medium of example 21, wherein one or more of the first meter and the second meter may be worn on a wrist, around a neck, or on a waistband.

Example 29 includes the non-transitory machine readable storage medium of example 21, wherein the audio data includes first audio data from the first meter and second audio data from the second meter, the first audio data corresponds to a first media signature, and the second audio data corresponds to a second media signature.

Example 30 includes the non-transitory machine readable storage medium of example 21, wherein the first meter corresponds to a first panelist, the second meter correspond to a second panelist, and the first panelist and the second panelist are members of a shared household.

Example 31 includes an apparatus to detect multiple wearable meter devices, the apparatus comprising means for obtaining to receive primary data from a first meter and a second meter, the primary data including at least one of (a) acceleration data and (b) short-range wireless communication data, and receive secondary data from the first meter and the second meter, the secondary data including at least one of (a) location data and (b) audio data, means for comparing to determine one or more primary factors based on the primary data, the one or more primary factors to include (a) a correlation coefficient based on the acceleration data, and (b) a difference between connected device sequences based on the short-range wireless communication data, determine one or more secondary factors based on the secondary data, the one or more secondary factors to include (a) a distance between the first meter and the second meter based on the location data, and (b) a difference between the audio data, and means for executing to determine, based on the one or more primary factors and the one or more secondary factors, whether the first meter and the second meter correspond to duplicate wear.

Example 32 includes the apparatus of example 31, wherein to determine whether the first meter and the second meter correspond to duplicate wear, the means for executing is to compare a weighted sum to a threshold.

Example 33 includes the apparatus of example 32, wherein to compare the weighted sum to the threshold, the means for executing is to apply at least one of a first weight to the correlation coefficient to produce a first value, and a second weight to the difference between connected device sequences to produce a second value, apply at least one of a third weight to the distance between the first meter and the second meter to produce a third value, and a fourth weight to the difference between the audio data to produce a fourth value, and add at least two of the first value, the second value, the third value, and the fourth value together to produce the weighted sum.

Example 34 includes the apparatus of example 33, wherein the means for executing is to obtain a first age of a first panelist corresponding to the first meter, obtain a second age of a second panelist corresponding to the second meter, and determine one or more of the first weight, the second weight, the third weight, and the fourth weight based on the first age and second age.

Example 35 includes the apparatus of example 33, wherein the means for executing is to determine one or more of the first weight, the second weight, the third weight, and the fourth weight based on how values in the primary data and the secondary data change over a period of time.

Example 36 includes the apparatus of example 31, wherein the means for executing is to implement a decision tree to determine whether the first meter and the second meter correspond to duplicate wear.

Example 37 includes the apparatus of example 31, wherein to determine the correlation coefficient, the means for comparing is further to measure a linear relationship between a change in the acceleration data from the first meter and the second meter over a period of time.

Example 38 includes the apparatus of example 31, wherein one or more of the first meter and the second meter may be worn on a wrist, around a neck, or on a waistband.

Example 39 includes the apparatus of example 31, wherein the audio data includes first audio data from the first meter and second audio data from the second meter, the first audio data corresponds to a first media signature, and the second audio data corresponds to a second media signature.

Example 40 includes the apparatus of example 31, wherein the first meter corresponds to a first panelist, the second meter correspond to a second panelist, and the first panelist and the second panelist are members of a shared household.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to detect multiple wearable meter devices, the apparatus comprising:
    interface circuitry to:
        obtain primary data from a first meter and a second meter, the primary data including at least one of: (a) acceleration data and (b) short-range wireless communication data; and
        obtain secondary data from the first meter and the second meter, the secondary data including at least one of: (a) location data and (b) audio data;
    comparator circuitry to:
        determine one or more primary factors based on the primary data, the one or more primary factors to include: (a) a correlation coefficient based on the acceleration data, and (b) a difference between connected device sequences based on the short-range wireless communication data;
        determine one or more secondary factors based on the secondary data, the one or more secondary factors to include: (a) a distance between the first meter and the second meter based on the location data, and (b) a difference between the audio data; and
    model executor circuitry to determine, based on the one or more primary factors and the one or more secondary factors, whether the first meter and the second meter correspond to duplicate wear.

2. The apparatus of claim 1, wherein to determine whether the first meter and the second meter correspond to duplicate wear, the model executor circuitry is to compare a weighted sum to a threshold.

3. The apparatus of claim 2, wherein to compare the weighted sum to the threshold, the model executor circuitry is to:
    apply at least one of:
        a first weight to the correlation coefficient to produce a first value; and
        a second weight to the difference between connected device sequences to produce a second value;
    apply at least one of:
        a third weight to the distance between the first meter and the second meter to produce a third value; and
        a fourth weight to the difference between the audio data to produce a fourth value; and
    add at least two of the first value, the second value, the third value, and the fourth value together to produce the weighted sum.

4. The apparatus of claim 3, wherein the model executor circuitry is to:
    obtain a first age of a first panelist corresponding to the first meter;
    obtain a second age of a second panelist corresponding to the second meter; and
    determine one or more of the first weight, the second weight, the third weight, and the fourth weight based on the first age and second age.

5. The apparatus of claim 3, wherein the model executor circuitry is to determine one or more of the first weight, the second weight, the third weight, and the fourth weight based on how values in the primary data and the secondary data change over a period of time.

6. The apparatus of claim 1, wherein the model executor circuitry is to implement a decision tree to determine whether the first meter and the second meter correspond to duplicate wear.

7. The apparatus of claim 1, wherein to determine the correlation coefficient, the comparator circuitry is further to measure a linear relationship between a change in the acceleration data from the first meter and the second meter over a period of time.

8. The apparatus of claim 1, wherein one or more of the first meter and the second meter may be worn on a wrist, around a neck, or on a waistband.

9. The apparatus of claim 1, wherein:
    the audio data includes first audio data from the first meter and second audio data from the second meter;
    the first audio data corresponds to a first media signature; and
    the second audio data corresponds to a second media signature.

10. The apparatus of claim 1, wherein:
    the first meter corresponds to a first panelist;
    the second meter correspond to a second panelist; and
    the first panelist and the second panelist are members of a shared household.

11. A method to detect multiple wearable meter devices, the method comprising:
receiving primary data from a first meter and a second meter, the primary data including at least one of: (a) acceleration data and (b) short-range wireless communication data;
receiving secondary data from the first meter and the second meter, the secondary data including at least one of: (a) location data and (b) audio data;
determining one or more primary factors based on the primary data, the one or more primary factors to include: (a) a correlation coefficient based on the acceleration data, and (b) a difference between connected device sequences based on the short-range wireless communication data;
determining one or more secondary factors based on the secondary data, the one or more secondary factors to include: (a) a distance between the first meter and the second meter based on the location data, and (b) a difference between the audio data; and
determining, based on the one or more primary factors and the one or more secondary factors, whether the first meter and the second meter correspond to duplicate wear.

12. The method of claim 11, wherein determining whether the first meter and the second meter correspond to duplicate wear further includes comparing a weighted sum to a threshold.

13. The method of claim 12, wherein comparing the weighted sum to the threshold further includes:
applying at least one of:
a first weight to the correlation coefficient to produce a first value; and
a second weight to the difference between connected device sequences to produce a second value;
applying at least one of:
a third weight to the distance between the first meter and the second meter to produce a third value; and
a fourth weight to the difference between the audio data to produce a fourth value; and
adding at least two of the first value, the second value, the third value, and the fourth value together to produce the weighted sum.

14. The method of claim 13, further including:
obtaining a first age of a first panelist corresponding to the first meter;
obtaining a second age of a second panelist corresponding to the second meter; and
determining one or more of the first weight, the second weight, the third weight, and the fourth weight based on the first age and second age.

15. The method of claim 13, further including determining one or more of the first weight, the second weight, the third weight, and the fourth weight based on how values in the primary data and the secondary data change over a period of time.

16. A non-transitory machine readable storage medium comprising instructions that, when executed, cause processor circuitry to at least:
obtain primary data from a first meter and a second meter, the primary data including at least one of: (a) acceleration data and (b) short-range wireless communication data;
obtain secondary data from the first meter and the second meter, the secondary data including at least one of: (a) location data and (b) audio data;
determine one or more primary factors based on the primary data, the one or more primary factors to include: (a) a correlation coefficient based on the acceleration data, and (b) a difference between connected device sequences based on the short-range wireless communication data;
determine one or more secondary factors based on the secondary data, the one or more secondary factors to include: (a) a distance between the first meter and the second meter based on the location data, and (b) a difference between the audio data; and
determine, based on the one or more primary factors and the one or more secondary factors, whether the first meter and the second meter correspond to duplicate wear.

17. The non-transitory machine readable storage medium of claim 16, wherein to determine whether the first meter and the second meter correspond to duplicate wear, the instructions cause the processor circuitry to compare a weighted sum to a threshold.

18. The non-transitory machine readable storage medium of claim 17, wherein to compare the weighted sum to the threshold, the instructions cause the processor circuitry to:
apply at least one of:
a first weight to the correlation coefficient to produce a first value; and
a second weight to the difference between connected device sequences to produce a second value;
apply at least one of:
a third weight to the distance between the first meter and the second meter to produce a third value; and
a fourth weight to the difference between the audio data to produce a fourth value; and
add at least two of the first value, the second value, the third value, and the fourth value together to produce the weighted sum.

19. The non-transitory machine readable storage medium of claim 18, wherein the instructions cause the processor circuitry to:
obtain a first age of a first panelist corresponding to the first meter;
obtain a second age of a second panelist corresponding to the second meter; and
determine one or more of the first weight, the second weight, the third weight, and the fourth weight based on the first age and second age.

20. The non-transitory machine readable storage medium of claim 18, wherein the instructions cause the processor circuitry to determine one or more of the first weight, the second weight, the third weight, and the fourth weight based on how values in the primary data and the secondary data change over a period of time.

* * * * *